US012261857B2

(12) United States Patent
Ushio et al.

(10) Patent No.: US 12,261,857 B2
(45) Date of Patent: Mar. 25, 2025

(54) ATTACK DETECTION METHOD, ATTACK DETECTION SYSTEM, AND RECORDING MEDIUM

(71) Applicant: Panasonic Intellectual Property Corporation of America, Torrance, CA (US)

(72) Inventors: Takashi Ushio, Tokyo (JP); Takamitsu Sasaki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 378 days.

(21) Appl. No.: 17/852,038

(22) Filed: Jun. 28, 2022

(65) Prior Publication Data

US 2022/0329611 A1 Oct. 13, 2022

Related U.S. Application Data

(63) Continuation of application No. PCT/JP2021/001545, filed on Jan. 18, 2021.

(30) Foreign Application Priority Data

Jan. 20, 2020 (JP) ................................ 2020-007070

(51) Int. Cl.
*H04L 9/40* (2022.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441; H04L 12/28; H04L 67/12; H04Q 9/00
See application file for complete search history.

(56) References Cited

U.S. PATENT DOCUMENTS 10,111,043 B1 * 10/2018 Cirit ....................... G06Q 10/02
2019/0193741 A1 * 6/2019 Hitomi ............ G08G 1/096791
(Continued)

FOREIGN PATENT DOCUMENTS

JP 2018-164159 10/2018
WO 2019/187350 10/2019

OTHER PUBLICATIONS

International Search Report (ISR) from International Searching Authority (Japan Patent Office) in International Pat. Appl. No. PCT/JP2021/001545, dated Mar. 30, 2021, together with an English language translation.

(Continued)

*Primary Examiner* — Henry Tsang
*Assistant Examiner* — Suman Debnath
(74) *Attorney, Agent, or Firm* — Greenblum and Bernstein, P.L.C.

(57) ABSTRACT

An attack detection method includes determining a sampling rule including a sampling interval and a sampling time on the basis of at least one of a statistic indicating a variation in sensor values included in the sensor data or event information on the mobility entity, which indicates the timing of a change in sensor values; generating sampling data including two or more sensor values selected from the sensor data on the basis of the sampling interval and the sampling time, first order information, and second order information; and calculating a first anomaly score indicating the degree of anomalies in the evaluation target data and a second anomaly score indicating the degree of anomalies in the evaluation target data, determining on the basis of the calculated first and second anomaly scores whether the evaluation target data has resulted from the attack, and outputting a determination result.

13 Claims, 17 Drawing Sheets

(56) References Cited

U.S. PATENT DOCUMENTS

| | | | | |
|---|---|---|---|---|
| 2019/0353502 | A1* | 11/2019 | Doshi | G01D 21/00 |
| 2020/0021611 | A1 | 1/2020 | Maeda et al. | |
| 2020/0099598 | A1 | 3/2020 | Takeda et al. | |
| 2020/0380354 | A1* | 12/2020 | Zhao | G06N 3/044 |

OTHER PUBLICATIONS

Malhotra et al., "Long Short Term Memory Networks for Anomaly Detection in Time Series", ESANN 2015 23rd European Symposium on Artificial Neural Networks, Computational Intelligence and Machine Learning, Apr. 2015, pp. 89-94.

* cited by examiner

| Sensor identifier | Data ID | Acquisition time [ms] | Sensor value |
|---|---|---|---|
| Vehicle speed | 1 | 25.00 | 22.11 |
| Vehicle speed | 2 | 50.01 | 22.50 |
| Vehicle speed | 3 | 75.15 | 23.11 |
| ... | ... | ... | ... |
| Vehicle speed | 41 | 1025.00 | 30.11 |
| Vehicle speed | 42 | 1050.00 | 33.50 |
| Vehicle speed | 43 | 1075.00 | 33.50 |
| ... | ... | ... | ... |
| Vehicle speed | 81 | 2025.00 | 35.11 |
| Vehicle speed | 82 | 2048.00 | 100.50 |
| Vehicle speed | 83 | 2050.00 | 35.50 |
| ... | ... | ... | ... |
| Vehicle speed | 2401 | 60025.00 | 40.11 |
| Shift | 1 | 30.00 | 3.00 (Drive) |
| ... | ... | ... | ... |
| Shift | 2000 | 60010.00 | 0.00 (Drive) |
| ... | ... | ... | ... |

152 153 154 155 156 157

| Sensor identifier | File number | Data variance | Vehicle event flag | Sampling interval [ms] | Sampling time [ms] |
|---|---|---|---|---|---|
| Vehicle speed | 1 | 0.22 | Present | 200.00 | 75.00 |
| ... | 1 | ... | | ... | ... |
| Vehicle speed | 2 | 0.22 | Absent | 1000.00 | 55.00 |
| ... | 2 | ... | | ... | ... |
| Vehicle speed | 3 | 10.22 | Absent | 200.00 | 75.00 |
| ... | 3 | ... | | ... | ... |

| Sensor identifier | Evaluation ID | Sensor value | First index | Second index |
|---|---|---|---|---|
| Vehicle speed | 1 | 22.11 | 1 | 1 |
| Vehicle speed | 2 | 22.50 | 2 | 1 |
| Vehicle speed | 41 | 30.11 | 1 | 2 |
| Vehicle speed | 42 | 33.50 | 2 | 2 |
| Vehicle speed | 81 | 35.11 | 1 | 3 |
| Vehicle speed | 82 | 100.50 | 2 | 3 |
| Vehicle speed | 83 | 35.50 | 3 | 3 |
| ... | ... | ... | ... | ... |
| Vehicle speed | 2401 | 40.11 | 1 | 60 |
| ... | ... | ... | ... | ... |

| Sensor identifier (192) | Evaluation ID (193) | Sensor value (194) | First index (195) | Second index (196) | Short-term sensor flow (197) | Long-term sensor flow (198) |
|---|---|---|---|---|---|---|
| Vehicle speed | 1 | 22.11 | 1 | 1 | [] | [] |
| ... | ... | ... | ... | ... | ... | ... |
| Vehicle speed | 81 | 35.11 | 1 | 3 | [] | [22.50, 33.50] |
| Vehicle speed | 82 | 100.50 | 2 | 3 | [35.11] | [22.50, 33.50] |
| Vehicle speed | 83 | 35.50 | 3 | 3 | [35.11, 35.11] | [22.50, 33.50, 35.11] |
| ... | ... | ... | ... | ... | ... | ... |

FIG. 14

| Sensor identifier (202) | Evaluation ID (203) | Sensor value (204) | First anomaly score (205) | Second anomaly score (206) | Third anomaly score (207) | Detection result (208) |
|---|---|---|---|---|---|---|
| Vehicle speed | 1 | 22.11 | 0 | 0 | 0 | "Unknown" |
| ... | ... | ... | ... | ... | ... | |
| Vehicle speed | 81 | 35.11 | 0 | 6 | 6 | "Normal" |
| Vehicle speed | 82 | 100.50 | 95 | 80 | 87 | "Attack" |
| Vehicle speed | 83 | 35.50 | 2 | 0 | 1 | "Normal" |
| ... | ... | ... | ... | ... | ... | |

ATTACK DETECTION METHOD, ATTACK DETECTION SYSTEM, AND RECORDING MEDIUM

CROSS REFERENCE TO RELATED APPLICATIONS

This is a continuation application of PCT International Application No. PCT/JP2021/001545 filed on Jan. 18, 2021, designating the United States of America, which is based on and claims priority of Japanese Patent Application No. 2020-007070 filed on Jan. 20, 2020. The entire disclosures of the above-identified applications, including the specifications, drawings and claims are incorporated herein by reference in their entirety.

FIELD

The present disclosure relates to an attack detection method, an attack detection system, and a recording medium for detecting an attack on sensor data.

BACKGROUND

Systems for monitoring automobiles (monitoring systems) are required to detect an attack on vehicle sensor data that is transmitted and received for the purpose of vehicle control (attack detection). The monitoring systems are also characterized as monitoring large-scale objects. It is thus necessary to bring down the cost of monitoring such as the cost of communication between automobiles and the system and the cost of computation for attack detection. For such monitoring systems with a reduced cost of computation, a technique has been disclosed in which a sampling log with a reduced amount of data is transmitted to a monitoring system, the amount of data being reduced by selecting feature quantities such as peak values from the result of frequency analysis conducted on sensor data to be monitored (see Patent Literature (PTL) 1, for example).

CITATION LIST

Patent Literature

PTL 1: Japanese Unexamined Patent Application Publication No. 2018-164159

PTL 2: International Publication No. 2019/187350

Non Patent Literature

NPL 1: P. Malhotra, "Long Short Term Memory Networks for Anomaly Detection in Time Series", 23rd European Symposium on Artificial Neural Networks, Computational Intelligence and Machine Learning, ESANN 2015.

SUMMARY

Technical Problem

With the technique disclosed in PTL 1, however, the data to be sampled is sampled at arbitrary time intervals determined by the monitoring system in order to reduce the amount of data. Thus, the sampled data may fail to include an attack message and may cause an overlook of an attack.

There is also known a technique in which an attack (attack message) is detected from messages that are sampled using the alienation of sensor data from the normal cycle (see PTL 2, for example). However, even with this technique, it is difficult to accurately detect an attack depending on the interval of acquisition of attack messages.

In view of this, there is demand for the ability to achieve both a reduction in the amount of data and high attack detection performance. It is, however, difficult with the conventional techniques as described above to achieve both a reduction in the amount of data and high attack detection performance.

The present disclosure provides an attack detection method, an attack detection system, and a recording medium capable of achieving both a reduction in the amount of data and high attack detection performance.

Solution to Problem

An attack detection method according to one aspect of the present disclosure is an attack detection method for detecting an attack on sensor data that is transmitted and received for control of a mobility entity inside the mobility entity. The attack detection method includes determining, for each of identifiers of sensor values included in the sensor data, a sampling rule that includes sampling intervals and sampling times in the sampling intervals, on a basis of at least one of a statistic or event information on the mobility entity, the sampling rule being a rule for selecting the sensor values that are used to detect the attack from the sensor data, the statistic indicating a variation in the sensor values included in the sensor data, and the event information indicating timing of a change in the sensor values, generating sampling data that includes two or more sensor values, first order information, and second order information on a basis of the sampling intervals and the sampling times, the two or more sensor values having been selected from the sensor data, the first order information indicating a temporal order of the two or more sensor values acquired during each of the sampling times, and the second order information indicating a temporal order of the two or more sensor values acquired in the sampling intervals, calculating a first anomaly score on a basis of a sensor value serving as evaluation target data included in the sampling data, the first order information, and a short-term sensor flow, the first anomaly score indicating a degree of an anomaly in the evaluation target data, the short-term sensor flow indicating time series data including a past sensor value acquired prior to the sensor value serving as the evaluation target data during a sampling time in which the sensor value serving as the evaluation target data has been acquired, among the sampling times, calculating a second anomaly score on a basis of the sensor value serving as the evaluation target data, the second order information, and a long-term sensor flow, the second anomaly score indicating a degree of an anomaly in the evaluation target data, the long-term sensor flow indicating a change in the sensor value acquired during a past sampling interval prior to a sampling interval in which the sensor value serving as the evaluation target data has been acquired among the sampling intervals, determining whether the evaluation target data has resulted from the attack on a basis of the first anomaly score and the second anomaly score that have been calculated, and outputting a determination result.

An attack detection system according to one aspect of the present disclosure is an attack detection system for detecting an attack on sensor data that is transmitted and received for control of a mobility entity inside the mobility entity. The attack detection system includes a sampling rule determiner that determines, for each of identifiers of sensor values included in the sensor data, a sampling rule that includes sampling intervals and sampling times in the sampling intervals, on a basis of at least one of a statistic or event information, the sampling rule being a rule for selecting the sensor values that are used to detect the attack from the sensor data, the statistic indicating a variation in the sensor values included in the sensor data, and the event information indicating timing of a change in the sensor values, a sampling data generator that generates sampling data on a basis of the sampling intervals and the sampling times, the sampling data including two or more sensor values selected from the sensor data, first order information, and second order information, the first order information indicating a temporal order of the two or more sensor values acquired during each of the sampling times, and the second order information indicating a temporal order of the two or more sensor values acquired in the sampling intervals, and an attack determiner that calculates a first anomaly score on a basis of a sensor value included in evaluation target data included in the sampling data, the first order information, and a short-term sensor flow, the first anomaly score indicating a degree of an anomaly in the evaluation target data, the short-term sensor flow indicating time series data including a past sensor values acquired prior to the sensor value serving as the evaluation target data during a sampling time in which the sensor value serving as the evaluation target data has been acquired, among the sampling times, calculates a second anomaly score on a basis of the sensor value serving as the evaluation target data, the second order information, and a long-term sensor flow, the second anomaly score indicating a degree of an anomaly in the evaluation target data, the long-term sensor flow indicating a change in sensor values acquired during a past sampling intervals prior to a sampling interval in which the sensor value serving as the evaluation target data has been acquired among the sampling intervals, determines whether the evaluation data has resulted from the attack on a basis of the first anomaly score and the second anomaly score that have been calculated, and outputs a determination result.

A recording medium according to one aspect of the present disclosure is a non-transitory computer-readable recording medium having recorded thereon a program for causing a computer to execute the attack detection method described above.

Advantageous Effects

According to one aspect of the present disclosure, it is possible to provide an attack detection method, an attack detection system, and a recording medium that achieve both a reduction in the amount of data and high attack detection performance.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 shows one example of vehicle sensor data according to the embodiment.

FIG. 10 shows one example of sampling data according to the embodiment.

FIG. 13 shows one example of base point data according to the embodiment.

FIG. 14 shows one example of a detection result according to the embodiment.

Figure 1:
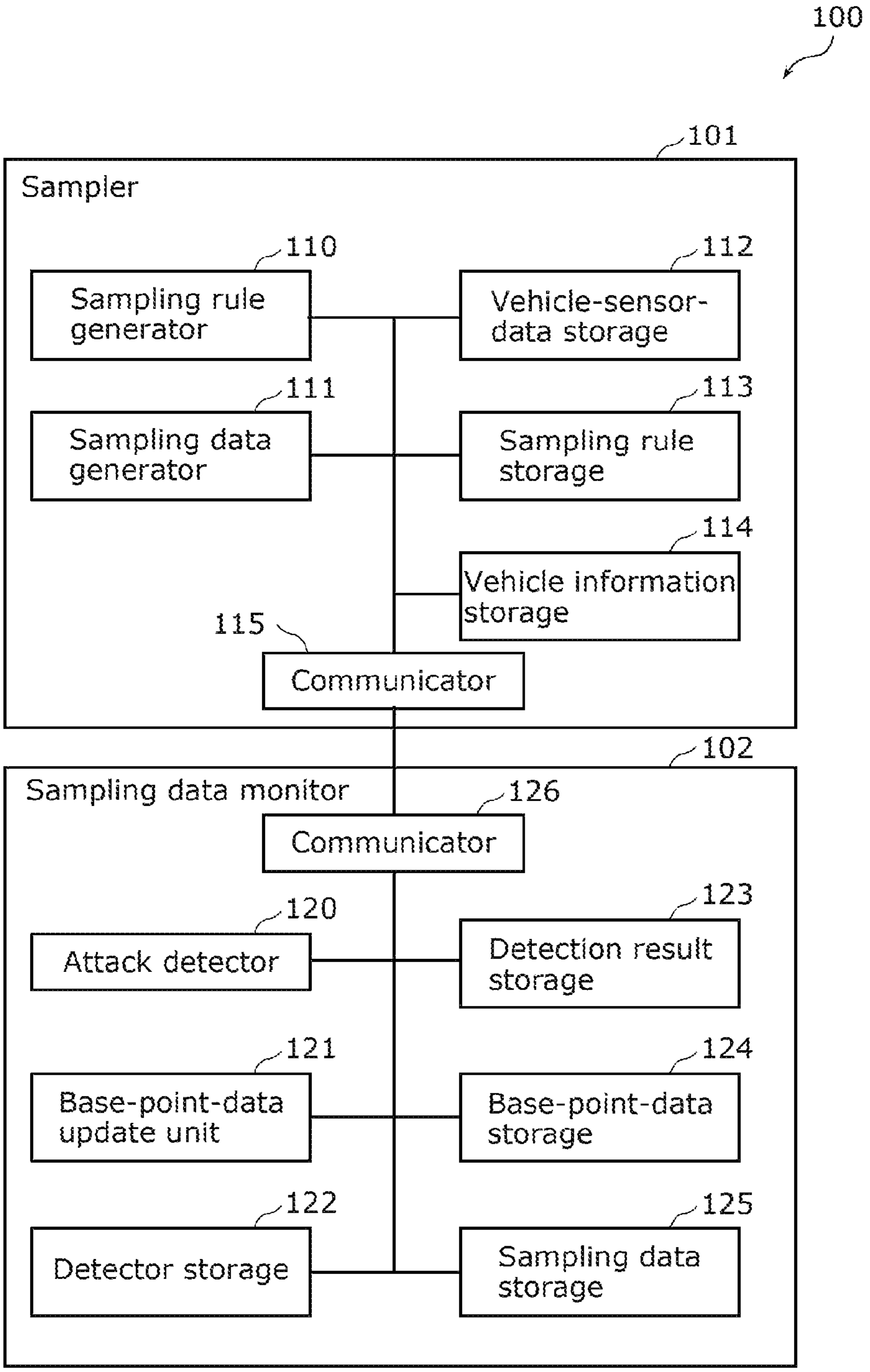
FIG. 1 is a block diagram illustrating a configuration of a monitoring system according to an embodiment.

DESCRIPTION OF EMBODIMENTS (Underlying Knowledge Forming Basis of the Present Disclosure)

In order to achieve a monitoring system that can be realized at a low monitoring cost, it is necessary to construct both an appropriate sampling technique and an appropriate attack detection technique.

According to PTL 1, in order to bring down the monitoring cost in the monitoring system, low-density data is generated by selecting representative values such as peak values at sampling intervals on the basis of the result of frequency analysis conducted on periodic sensor data. Thus, PTL 1 is based on the premise that sensor values can be acquired periodically or that sensor values are regular values.

There are, however, cases in which the interval of acquisition or the regularity of sensor values may be disturbed profoundly by attackers. In such cases, PTL 1 in which representative values are selected simply may have difficulty in attack detection due to undetected attack values that are launched by attackers during sampling of periodic sensor data. That is, there are cases in which sampling may fail to sample attack values launched by attackers. Thus, there is demand to construct a sampling technique that is more appropriate for attack detection.

With the attack detection technique according to PTL 2, the normal cycle of sensor data is calculated in advance, and when the actually observed cycle does not fall within a given range determined by adding margins to the normal cycle, it is determined that the sensor data includes an attack message. The margins are ranges that allow for delays that may be caused by collisions between normal messages and attack messages. This technique is robust as a technique capable of detecting attack messages or other information that have been added.

However, according to PTL 2, the presence or absence of an attack is determined based on the time of acquisition of a message. Thus, it is difficult to apply the technique according to PTL 2 to such data that is obtained by sampling the sensor data at a sampling interval that is equivalent to the interval of acquisition of one sensor value.

As another attack detection technique, Non-Patent Literature (NPL) 1 discloses a technique in which normal behaviors of sensor values are learned in advance, and when the result of predicting the next sensor value on the basis of the list of actually observed sensor values indicates an alienation from the normal behaviors, the presence of an attack message is determined. This technique is also applicable to time series data that is sampled at time intervals longer than the cycle such as the sampling interval.

However, the list of actually observed sensor values that are used to predict the next sensor value needs to be filled in order to avoid the inclusion of attack messages.

Therefore, in order to solve the problem described above, a further improvement in the attack detection technique becomes necessary, in addition to the construction of an appropriate sampling technique. That is, it is desired to achieve both a reduction in the amount of data and high attack detection performance. In view of this, the inventors of the present disclosure have eagerly considered an attack detection method and the like capable of achieving both a reduction in the amount of data and high attack detection performance and have invented an attack detection method and the like described below.

An attack detection method according to one aspect of the present disclosure is an attack detection method for detecting an attack on sensor data that is transmitted and received for control of a mobility entity inside the mobility entity. The attack detection method includes determining, for each of identifiers of sensor values included in the sensor data, a sampling rule that includes sampling intervals and sampling times in the sampling intervals, on a basis of at least one of a statistic or event information on the mobility entity, the sampling rule being a rule for selecting the sensor values that are used to detect the attack from the sensor data, the statistic indicating a variation in the sensor values included in the sensor data, and the event information indicating timing of a change in the sensor values, generating sampling data that includes two or more sensor values, first order information, and second order information on a basis of the sampling intervals and the sampling times, the two or more sensor values having been selected from the sensor data, the first order information indicating a temporal order of the two or more sensor values acquired during each of the sampling times, and the second order information indicating a temporal order of the two or more sensor values acquired in the sampling intervals, calculating a first anomaly score on a basis of a sensor value serving as evaluation target data included in the sampling data, the first order information, and a short-term sensor flow, the first anomaly score indicating a degree of an anomaly in the evaluation target data, the short-term sensor flow indicating time series data including a past sensor value acquired prior to the sensor value serving as the evaluation target data during a sampling time in which the sensor value serving as the evaluation target data has been acquired, among the sampling times, calculating a second anomaly score on a basis of the sensor value serving as the evaluation target data, the second order information, and a long-term sensor flow, the second anomaly score indicating a degree of an anomaly in the evaluation target data, the long-term sensor flow indicating a change in the sensor value acquired during a past sampling interval prior to a sampling interval in which the sensor value serving as the evaluation target data has been acquired among the sampling intervals, determining whether the evaluation target data has resulted from the attack on a basis of the first anomaly score and the second anomaly score that have been calculated, and outputting a determination result.

According to this attack detection method, the sampling data is generated by adjusting the sampling intervals and the sampling times on the basis of the feature of the sensor data targeted for the attack detection processing. Moreover, the presence or absence of an attack is determined by calculating the two types of anomaly scores on the basis of the sampling data including the two types of order information (e.g., indices) that respectively indicate the temporal orders of sensor values sampled during the sampling times (short term) and a temporal order of sensor values sampled in the sampling intervals (long term). For example, the amount of data can be reduced by setting at least either of the sampling intervals and the sampling times longer. Besides, the calculation of the two types of anomaly scores enables detecting an attack more accurately than in the case where only one type of anomaly score is calculated. This improves the accuracy of attack detection while bringing down the monitoring cost. It is thus possible to achieve both a reduction in the amount of data and high attack detection performance.

For example, the statistic may include a variance value that indicates the variation in the sensor values for each of identifiers of the sensor values, the event information includes flag information that indicates whether a change has occurred in the sensor values. In the determining of the sampling rule, the sampling intervals and the sampling times may be determined based on the variance value and the flag information.

The use of both the variance value for sensor values and the flag information enables more accurately determining the sampling intervals and the sampling times.

For example, in the determining of the sampling rule, the sampling times and the sampling intervals may be determined based on a combination of a determination result indicating whether the variance value is greater than or equal to a first threshold value and information indicating whether the flag information indicates no occurrence of a change in the sensor values.

This allows the sampling intervals and the sampling times to be determined from the combination of the determination result of the variance value for the sensor data and the contents of the event information. Accordingly, the sampling intervals and the sampling times can be determined more appropriately from the determination result. For example, when the variance value is less than the first threshold value, the sensor values are stable and therefore at least either of the sampling intervals and the sampling times can be set to a long time. This allows an appropriate reduction in the amount of sensor data to be selected.

For example, the flag information may include information indicating whether at least one of events has occurred, the events including switching between ON and OFF of an actuator of the mobility entity, switching of a shift lever, and switching between ON and OFF of a self-operating mode.

This allows the sampling intervals and the sampling times to be determined on the basis of the actuator of the mobility entity, the shift lever, and the switching of the self-operating mode. For example, at least either of the sampling intervals and the sampling times after the elapse of a predetermined period of time after switching can be set to long times. This allows a more appropriate reduction in the amount of sensor data.

For example, the generating of the sampling data may include determining, for each of the sampling times, a total number of sensor data items to be selected during the sampling time on a basis of a total number of normally received data items that are to be observed during the sampling time, and selecting the total number of sensor data items to be selected that has been determined.

Accordingly, the amount of sensor data can be reduced more appropriately on the basis of the total number of observed sensor data items.

For example, the generating of the sampling data may include determining whether the total number of sensor values observed during the sampling time is greater than or equal to the total number of normally received data items, when a total number of the sensor values is greater than or equal to the total number of normally received data items, selecting a predetermined number of the sensor values, and when the total number of the sensor values is less than the total number of normally received data items, selecting all of the sensor values included in the sensor data.

This allows sensor data including attack data to be sampled while reducing the likelihood that the attack data will not be detected. Accordingly, accurate attack detection from the sampling data is possible.

For example, the first order information may be a first index that indicates an order in which the two or more sensor values have been acquired during each of the sampling times, the second order information may be a second index that indicates an order of the sampling intervals in which the two or more sensor values have been acquired, and the determining of the attack may include when the first index associated with the evaluation target data is less than a third threshold value and the second index associated with the evaluation target data is less than a fourth threshold value, determining that whether the evaluation target data has resulted from the attack is unknown, when a third anomaly score based on the first anomaly score and the second anomaly score is greater than or equal to a fifth threshold value, determining that the evaluation target data has resulted from the attack, when the third anomaly score is less than the fifth threshold value, determining that the evaluation target data is normal, and outputting the determination result that indicates a result of the determination and that is associated with the evaluation target data.

This allows integral determination based on short- and long-term changes in the sensor values while reducing the number of evaluation target data items in the sampling data, which have difficulty in attack detection. Accordingly, accurate attack detection from the sampling data is possible.

For example, the attack detection method described above may further include updating the short-term sensor flow and the long-term sensor flow on a basis of the determination result associated with the evaluation target data, the first order information, and the second order information.

This allows updating of the short- and long-term sensor flows that are used to determine the presence or absence of an attack. The use of the updated short- and long-term sensor flows improves attack detection performance.

For example, the updating may include when the determination result associated with the evaluation target data indicates that the evaluation target data has resulted from the attack, estimating a sensor value that the evaluation target data is supposed to take from at least one of the short-term sensor flow or the long-term sensor flow and updating the short-term sensor flow and the long-term sensor flow on a basis of the first order information, the second order information, and the sensor value that has been estimated, and when the determination result associated with the evaluation target data indicates that the evaluation target data is normal or that whether the evaluation target data has resulted from the attack is unknown, updating the short-term sensor flow and the long-term sensor flow on a basis of the first order information, the second order information, and the sensor values serving as the evaluation target data.

Accordingly, even if the sampling data includes attack data, it is possible to remove the attack data and to appropriately update the short- and long-term sensor flows. That is, it is possible to reduce the likelihood that the short- and long-term sensor flows may include the attack data. Accordingly, more accurate attack detection from the sampling data is possible.

For example, the sensor data may be stored in equipment that is mounted on the mobility entity, and may indicate a result of decoding network data that is expressed in byte form and transmitted and received at an arbitrary running time interval according to at least one protocol among a controller area network (CAN: registered trademark), a CAN with flexible data-rate (CAN FD), FlexRay (registered trademark), and Ethernet (registered trademark).

This achieves both a reduction in the amount of data and high attack detection performance in networks that carry out communications according to at least one protocol among a controller area network (CAN: registered trademark), a CAN with flexible data-rate (CAN FD), FlexRay (registered trademark), and Ethernet (registered trademark).

For example, the mobility entity may be a vehicle.

This suppresses deterioration in attack detection performance for attacks on a vehicle having limited calculation resources while reducing the amount of data on the vehicle.

An attack detection system according to one aspect of the present disclosure is an attack detection system for detecting an attack on sensor data that is transmitted and received for control of a mobility entity inside the mobility entity. The attack detection system includes a sampling rule determiner that determines, for each of identifiers of sensor values included in the sensor data, a sampling rule that includes sampling intervals and sampling times in the sampling intervals, on a basis of at least one of a statistic or event information, the sampling rule being a rule for selecting the sensor values that are used to detect the attack from the sensor data, the statistic indicating a variation in the sensor values included in the sensor data, and the event information indicating timing of a change in the sensor values, a sampling data generator that generates sampling data on a basis of the sampling intervals and the sampling times, the sampling data including two or more sensor values selected from the sensor data, first order information, and second order information, the first order information indicating a temporal order of the two or more sensor values acquired during each of the sampling times, and the second order information indicating a temporal order of the two or more sensor values acquired in the sampling intervals, and an attack determiner that calculates a first anomaly score on a basis of a sensor value included in evaluation target data included in the sampling data, the first order information, and a short-term sensor flow, the first anomaly score indicating a degree of an anomaly in the evaluation target data, the short-term sensor flow indicating time series data including a past sensor values acquired prior to the sensor value serving as the evaluation target data during a sampling time in which the sensor value serving as the evaluation target data has been acquired, among the sampling times, calculates a second anomaly score on a basis of the sensor value serving as the evaluation target data, the second order information, and a long-term sensor flow, the second anomaly score indicating a degree of an anomaly in the evaluation target data, the long-term sensor flow indicating a change in sensor values acquired during a past sampling intervals prior to a sampling interval in which the sensor value serving as the evaluation target data has been acquired among the sampling intervals, determines whether the evaluation data has resulted from the attack on a basis of the first anomaly score and the second anomaly score that have been calculated, and outputs a determination result. Furthermore, a recording medium according to one aspect of the present disclosure is a non-transitory computer-readable recording medium having recorded thereon a program for causing a computer to execute the attack detection method described above.

The attack detection system and the recording medium achieve effects similar to those achieved by the attack detection method described above.

Note that these comprehensive or specific aspects may be implemented as systems, methods, integrated circuits, computer programs, or computer-readable recording media such as CD-ROMs, or may be implemented as any combination of systems, methods, integrated circuits, computer programs, and recording media.

A monitoring method according to one embodiment (one example of the attack detection method) will be described hereinafter with reference to the accompanying drawings. Each embodiment described below is a comprehensive or specific example of the present disclosure. Therefore, numerical values, constituent elements, the form of arrangement and connection of constituent elements, steps, and the order of steps, and so on described in the following embodiments are merely examples and do not intend to limit the scope of the present disclosure. Among the constituent elements described in the following embodiments, those that are not recited in any independent claim are described as arbitrary constituent elements. Moreover, each figure is a schematic diagram and is not always illustrated in precise dimensions.

Embodiment

First, a configuration of a monitoring system according to one embodiment of the present disclosure will be described. The present embodiment describes an example in which monitoring system 100 serves as an information processing system for detecting an attack on sensor data (vehicle sensor data) that is transmitted and received for vehicle control inside a vehicle. The vehicle is one example of a mobility entity targeted for attack detection by monitoring system 100. Monitoring system 100 is one example of an attack detection system.

[1-1. Configuration of Monitoring System]

FIG. 1 is a block diagram illustrating a configuration of monitoring system 100 according to the present embodiment.

Monitoring system 100 is a system for determining the presence or absence of an attack for each of evaluation target data items included in vehicle sensor data (see FIG. 5). Monitoring system 100 determines whether the evaluation target data has resulted from an attack. The determination as to whether the evaluation target data has resulted from an attack may also be referred to as the determination as to whether the evaluation target data is attack data. It can also be said that the evaluation target data refers to sensor values targeted for the determination of the presence or absence of attack data.

The vehicle sensor data is stored in equipment mounted on the vehicle and may, for example, be the result of decoding network data that is expressed in bytes and transmitted and received at arbitrary running time intervals (one example of transit time intervals) according to at least one protocol among a controller area network (CAN: registered trademark), a CAN with flexible data rate (CAN FD), FlexRay (registered trademark), and Ethernet (registered trademark).

Monitoring system 100 includes sampler 101 and sampling data monitor 102. For example, sampler 101 may be mounted on a vehicle, and sampling data monitor 102 may be arranged in a different place from the vehicle (e.g., a monitoring center in a distant area). Sampler 101 and sampling data monitor 102 are communicably connected to each other (e.g., capable of wireless communication).

Sampler 101 accumulates vehicle sensor data transmitted and received for vehicle control, selects sensor values for use in monitoring by sampling data monitor 102 from a plurality of accumulated sensor values (vehicle sensor data) according to a sampling rule, and transmits sampling data including the selected sensor values to sampling data monitor 102. The sampling rule is dynamically determined by sampler 101. For example, sampler 101 determines a sampling rule for each identifier of the sensor values included in the vehicle sensor data (hereinafter, also referred to as sensor identifiers) on the basis of at least one of a statistic and vehicle event information, the statistic indicating a variation in the sensor values of the vehicle sensor data, and the vehicle event information indicating the timing of changes in the features of the sensor values (e.g., changes in the sensor values). For example, the sampling data may include two or more sensor values. Note that the sensor identifiers, which will be described later, refer to information for uniquely identifying the vehicle sensor data such as "vehicle speed" and "shift".

The vehicle sensor data includes sensor values (e.g., sensing results such as vehicle speed, acceleration, and steering angle) of various sensors mounted on the vehicle. The sampling rule, which will be described later (see FIG. 6), includes a sampling interval and a sampling time included in each sampling interval.

The vehicle event information includes information on non-periodic vehicle events and may include, for example, flag information that indicates whether a change has occurred in the sensor values. For example, the flag information may include information indicating the occurrence of at least one of the following events: switching between ON and OFF of the vehicle's engine (one example of an actuator of the mobility entity), switching of a shift lever, and switching between ON and OFF of a self-operating mode. For example, the flag information may include "1" that indicates "occurrence" when a vehicle event has occurred, and may include "0" that indicates "no occurrence" when no vehicle event has occurred. The monitoring includes processing for detecting a cyberattack on the vehicle. Note that the switching between ON and OFF of the vehicle's engine may refer to, for example, restart of the engine.

Sampler 101 includes sampling rule generator 110, sampling data generator 111, vehicle-sensor-data storage 112, sampling rule storage 113, vehicle information storage 114, and communicator 115.

Sampling-rule generator 110 is a processing unit that determines a sampling rule for generating selected data, on the basis of at least one of the vehicle sensor data and a vehicle event. In the present embodiment, sampling rule generator 110 determines the sampling rule on the basis of both of the vehicle sensor data and a vehicle event. For example, sampling rule generator 110 determines the sampling rule on the basis of a statistic that indicates a variation in the sensor values of the vehicle sensor data and the timing of occurrence of a vehicle event. Sampling rule generator 110 is one example of a sampling rule determiner.

Note that the statistic of the sensor values may be any indicator that indicates a variation in the sensor values. In the present embodiment, the statistic of the sensor values is a variance value that indicates a variation in sensor values for each identifier (data variance). The variance value is a value that indicates the degree of dispersion of the sensor values and calculated by squaring each deviation (difference between each sensor value and an average value) and taking an average of the deviations. The variance value may, for example, be a standard deviation.

The timing of occurrence of a vehicle event indicates the timing when the vehicle event has occurred, and it can also be said that the timing of occurrence of a vehicle event indicates the timing of a change in the features of sensor values. It can also be said that the timing of occurrence of a vehicle event indicates the presence or absence of occurrence of the vehicle event.

Sampling rule generator 110 may, for example, be a processing unit that determines a sampling rule for each sensor identifier of the sensor values included in the vehicle sensor data. For example, sampling rule generator 110 determines a sampling rule for one sensor identifier on the basis of a plurality of sensor values corresponding to the one sensor identifier. The sampling rule is a rule for generating sampling data from the sensor values that correspond to the one sensor identifier.

Sampling data generator 111 is a processing unit that generates sampling data that is transmitted to sampling data monitor 102, on the basis of the sampling rule determined by sampling rule generator 110. For example, sampling data generator 111 selects two or more sensor values from a plurality of sensor values stored in vehicle-sensor-data storage 112 according to the determined sampling rule and generating sampling data that includes the two or more selected sensor values.

For example, sampling data generator 111 generates sampling data that includes a first index, a second index, and two or more sensor values selected from a plurality of sensor values (vehicle sensor data) on the basis of the sampling interval and the sampling time, the first index indicating a temporal order of the two or more sensor values sampled during the sampling time, and the second index indicating a temporal order of the two or more sensor values sampled in the sampling intervals. The first and second indices are added to each sensor value.

The first index indicates the (observed) order in which the two or more sensor values are acquired during the sampling time, and it can also be said that the first index indicates the order of short-term movement (change) of the sensor values during the sampling time. The second index indicates an order of (observed) sampling intervals at which the two or more sensor values are acquired, and it can also be said that the second index indicates the order of long-term movement (change) of the sensor values acquired in the sampling intervals. The first index is one example of first order information, and the second index is one example of second order information.

Vehicle-sensor-data storage 112 is a storage device that stores a plurality of sensor values (vehicle sensor data) that are transmitted and received for vehicle control. Vehicle-sensor-data storage 112 accumulates a plurality of sensor values.

Sampling rule storage 113 is a storage device that stores the sampling rule determined by sampling rule generator 110.

Vehicle information storage 114 is a storage device that stores vehicle events. For example, vehicle information storage 114 stores vehicle event information that associates the contents of each vehicle event with the time of occurrence of the vehicle event.

Communicator 115 is a processing unit that has the function of communicating with sampling data monitor 102 via a public communication network such as the Internet. For example, communicator 115 may be configured to include a communication circuit (communication module).

Next, sampling data monitor 102 monitors the vehicle on the basis of the sampling data acquired from sampler 101. Specifically, sampling data monitor 102 calculates a first anomaly score that indicates short-term anomalies and a second anomaly score that indicates long-term anomalies on the basis of the sampling data, and determines on the basis of the calculated two anomaly scores whether the sensor values to be evaluated (hereinafter, also referred to as "evaluation target data") are values resulting from an attack. That is, sampling data monitor 102 determines whether the evaluation target data is attack data. It can also be said that sampling data monitor 102 determines whether the vehicle is under cyberattack. Sampling data monitor 102 is characterized in that attack detection is based on the two anomaly scores.

Note that the short-term anomalies refer to anomalies detected based on the vehicle sensor data acquired in a short time and refer to, for example, anomalies detected based on the vehicle sensor data acquired during one sampling time. The long-term anomalies refer to anomalies detected based on the vehicle sensor data acquired in a long time longer than the short time and refer to, for example, anomalies detected based on the vehicle sensor data acquired in a plurality of sampling intervals.

Sampling data monitor 102 includes attack detector 120, base-point-data update unit 121, detector storage 122, detection result storage 123, base-point-data storage 124, sampling data storage 125, and communicator 126.

Attack detector 120 is a processing unit that determines whether the evaluation target data is attack data, on the basis of the sampling data acquired from sampler 101. Attack detector 120 calculates the first and second anomaly scores and determines on the basis of the calculated first and second anomaly scores whether the evaluation target data has resulted from an attack, and outputs a determination result. The calculation of the first and second anomaly scores will be described later.

Base-point-data update unit 121 is a processing unit that updates a short-term sensor flow and a long-term sensor flow on the basis of detection-result information and first and second indices in the selected vehicle sensor data, the detection-result information indicating the result of detection of the evaluation target data by attack detector 120.

The short-term sensor flow is time series data including sensor values that are used to detect short-term anomalies and is, for example, generated based on sensor values acquired during one sampling time. For example, the short-term sensor flow is generated based on sensor values acquired during the sampling time in which the evaluation target data has been acquired. It can also be said that the short-term sensor flow indicates short-term movement of sensor values that are determined or estimated to be normal.

The long-term sensor flow is time series data of sensor values that are used to detect long-term anomalies, and is longer than the short-term sensor flow. For example, the long-term sensor flow may be generated based on sensor values acquired in a plurality of sampling intervals. It can also be said that the long-term sensor flow indicates long-term movement of sensor values that are determined or estimated to be normal.

Note that data that includes the short-term sensor flow and the long-term sensor flow is also referred to as base point data. The base point data does not include sensor values that are determined to be abnormal (attack) by attack detector 120. It can also be said that the base point data is time series data of sensor values that are determined or estimated to be normal.

Detector storage 122 is a storage device that stores a first detector and a second detector. The first detector is a detector for calculating the first anomaly score that indicates the degree of alienation between the short-term sensor flow and the evaluation target data, and the second detector is a detector for calculating the second anomaly score that indicates the degree of alienation between the long-term sensor flow and the evaluation target data. The first detector may be implemented as, for example, a trained model that has undergone machine learning so as to receive input of the short-term sensor flow and the evaluation target data and to calculate the first anomaly score. The second detector may be implemented as, for example, a trained model that has undergone machine learning so as to receive input of the long-term sensor flow and the evaluation target data and to calculate the second anomaly score. Note that storing trained models refers to storing information on features of machine learning models such as network parameters and computational algorithms (machine learning algorithms).

Detection result storage 123 is a storage device that stores the result of detection by attack detector 120.

Base-point-data storage 124 is a storage device that stores the short-term sensor flow and the long-term sensor flow (base point data) that are used to determine the presence or absence of an attack by attack detector 120.

Sampling data storage 125 is a storage device that stores the sampling data acquired from sampler 101.

Communicator 126 is a processing unit that has the function of communicating with sampler 101 via a public communication network such as the Internet. For example, communicator 126 may be configured to include a communication circuit (communication module).

Vehicle-sensor-data storage 112, sampling rule storage 113, vehicle information storage 114, detector storage 122, detection result storage 123, base-point-data storage 124, and sampling data storage 125 may be configured as, for example, nonvolatile rewritable memories such as hard disk drives or solid-state drives.

Sampling rule generator 110, sampling data generator 111, communicator 115, attack detector 120, base-point-data update unit 121, and communicator 126 may be configured as, for example, processors such as CPUs, ASICs, or field programmable gate arrays (FPGAs). Note that each functional block of monitoring system 100 is implemented by a processor such as a CPU executing a computer-readable program stored in a computer.

There are no particular limitations on the method of communication between sampler 101 and sampling data monitor 102. When the communication method is wireless communication, the communication between sampler 101 and sampling data monitor 102 may be carried out by infrared communication or radio communication. The wireless communication may be communication carried out via wireless fidelity (Wi-Fi: registered trademark) or Bluetooth (registered trademark). As another alternative, for example, the communication between sampler 101 and sampling data monitor 102 may be cable communication In the case where sampler 101 and sampling data monitor 102 are configured as an integral unit, the communication between sampler 101 and sampling data monitor 102 does not necessarily have to be via communicators 115 and 126. In this case, the configurations of communicators 115 and 126 become unnecessary.

[1-2. Overview of Operations of Monitoring System]

Figure 2:
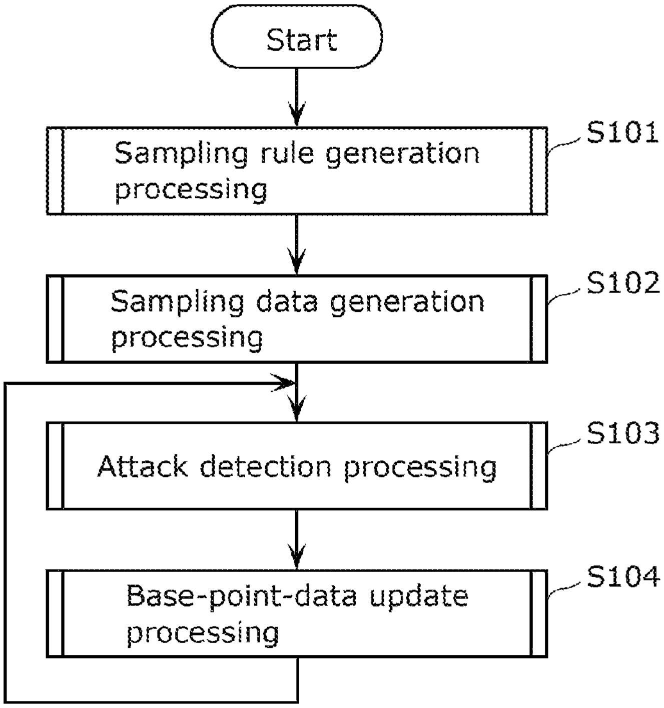
FIG. 2 is a flowchart illustrating an overview of operations of the monitoring system according to the embodiment.

Next, operations of monitoring system 100 configured as described above will be described. FIG. 2 is a flowchart illustrating an overview of operations (attack detection method) of monitoring system 100 according to the present embodiment. In FIG. 2, steps S101 and S102 may correspond to, for example, processing that is executed by sampler 101, and steps S103 and S104 may correspond to, for example, processing that is executed by sampling data monitor 102.

First, monitoring system 100 performs sampling rule generation processing for generating a sampling rule that indicates a sampling interval and a sampling time, using vehicle sensor data that is acquired during a predetermined running time of the vehicle and stored in vehicle-sensor-data storage 112 (S101). The processing in step S101 is conducted by sampling rule generator 110. The predetermined running time may, for example, be set in advance or set by a monitor who monitors the vehicle via monitoring system 100. Note that step S101 is one example of a sampling rule determination step.

Next, monitoring system 100 performs sampling data generation processing for generating sampling data from the vehicle sensor data according to the determined sampling rule (S102). The processing in step S102 is conducted by sampling data generator 111. Note that step S102 is one example of a sampling data generation step.

Sampling data generator 111 selects some items (sensor values) of the vehicle sensor data from the vehicle sensor data according to the sampling rule and adds the first and second indices to each of the selected vehicle sensor data items (sensor values) to generate sampling data. That is, the sampling data includes the selected vehicle sensor data, the first indices, and the second indices.

Then, sampling data generator 111 transmits the generated sampling data to communicator 126 via communicator 115. That is, sampling data generator 111 transmits the generated sampling data to sampling data monitor 102.

Next, monitoring system 100 performs attack detection processing for calculating anomaly scores from the vehicle sensor data (evaluation target data) included in the sampling data (S103). The processing in step S103 is conducted by attack detector 120. Step S103 is one example of an attack determination step.

Attack detector 120 conducts the attack detection processing for calculating anomaly scores each indicating the degree of anomalies in the sensor values of the evaluation target data by two types of calculation methods using the base point data stored in base-point-data storage 124 and determining on the basis of the two types of calculated anomaly scores whether the sensor values in the evaluation target data are values resulting from an attack.

Next, monitoring system 100 performs base-point-data update processing for updating the base point data that are used in the attack detection processing that is performed on the next evaluation target data, using the first and second indices in the evaluation target data and the result of the attack detection processing (determination result) (S104). The processing in step S104 is conducted by base-point-data update unit 121. Step S104 is one example of an updating step.

Hereinafter, a detailed configuration of each processing unit and detailed operations that are performed in each step in the flowchart will be described.

[2-1. Configuration of Sampling Rule Generator]

Figure 3:
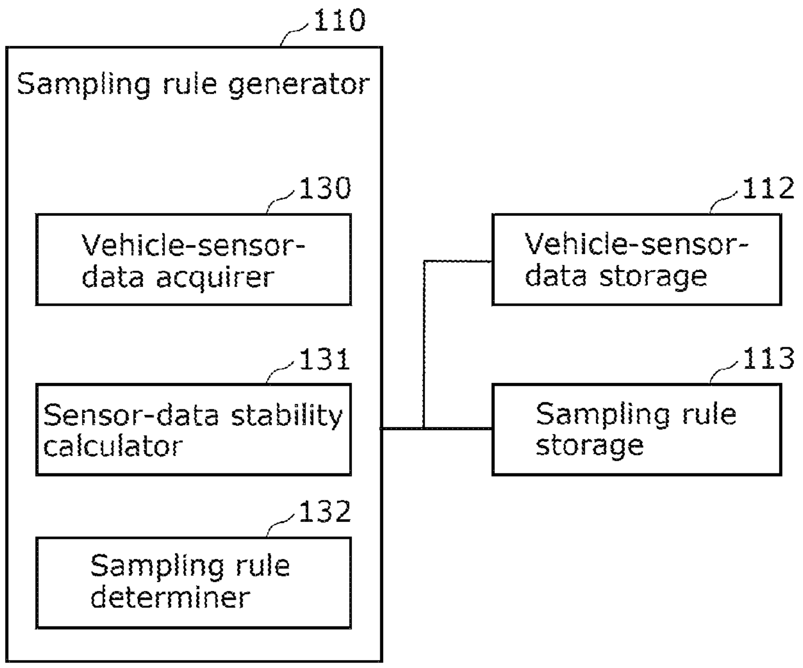
FIG. 3 is a block diagram illustrating a configuration of a sampling rule generator according to the embodiment.

FIG. 3 is a block diagram illustrating a configuration of sampling rule generator 110 according to the present embodiment. As illustrated in FIG. 3, sampling rule generator 110 includes vehicle-sensor-data acquirer 130, sensor-data stability calculator 131, and sampling rule determiner 132.

Vehicle-sensor-data acquirer 130 is a processing unit that acquires vehicle sampling data from vehicle-sensor-data storage 112. Vehicle-sensor-data acquirer 130 reads out the vehicle sensor data stored in vehicle-sensor-data storage 112.

Sensor-data stability calculator 131 is a processing unit that calculates information that is used to determine the sampling rule by sampling rule determiner 132, on the basis of the vehicle sensor data. For example, sensor-data stability calculator 131 may calculate a statistic of sensor values for each sensor identifier. In the present embodiment, sensor-data stability calculator 131 calculates a variance value of sensor values for each sensor identifier.

Note that the sensor identifier includes a periodic-type identifier such as vehicle speed that is transmitted and received periodically, and an event-type identifier that is generated in accordance with, for example, the driver's operation such as shift switching.

Sampling rule determiner 132 determines the sampling rule for each sensor identifier included in the vehicle sensor data, using at least one of the statistic and the vehicle event information. In the present embodiment, sampling rule determiner 132 determines the sampling rule, using both of the statistic and the vehicle event information.

[2-2. Operations of Sampling Rule Generator]

Figure 4:
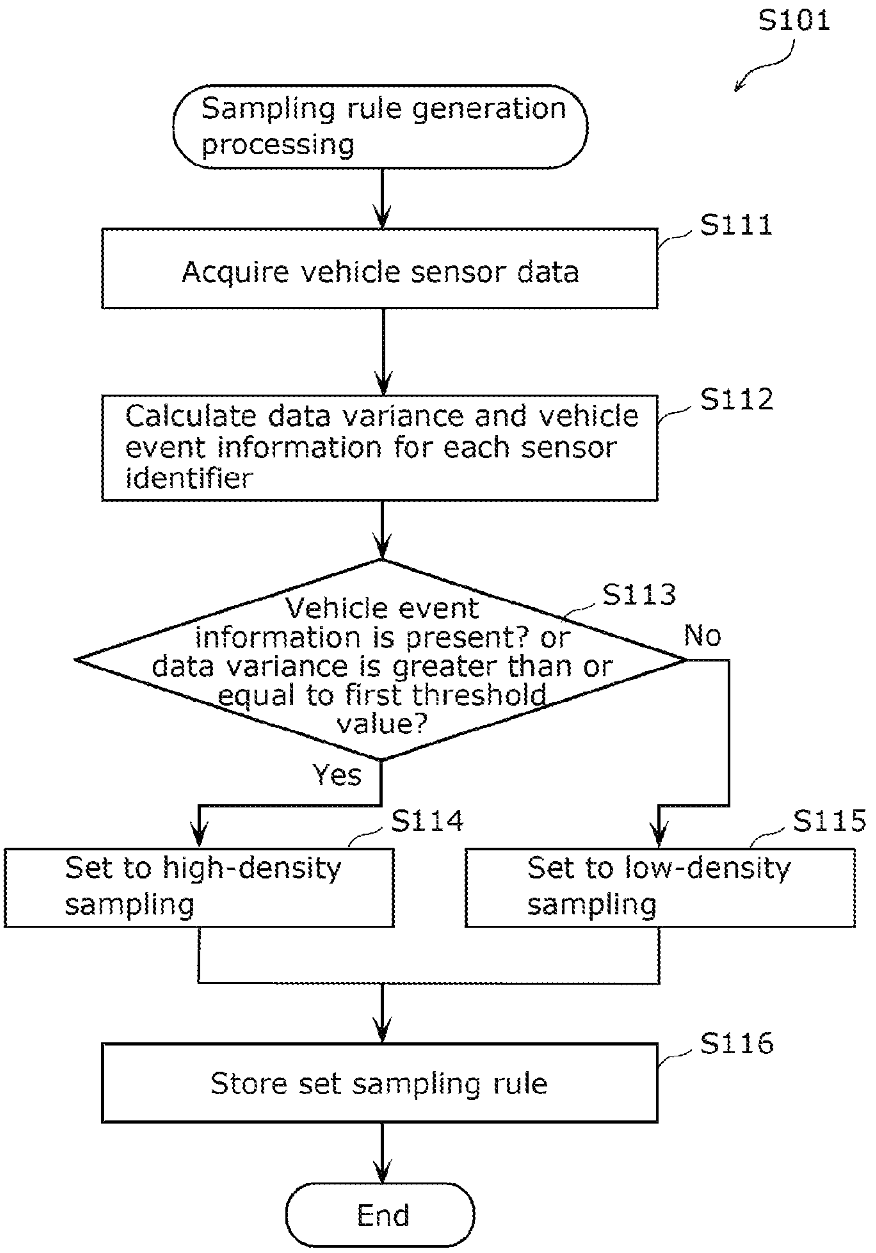
FIG. 4 is a flowchart illustrating sampling rule generation processing according to the embodiment.

FIG. 4 is a flowchart illustrating the sampling rule generation processing (S101) according to the present embodiment.

First, sampling rule generator 110 acquires vehicle sensor data during a predetermined running time of the vehicle stored in vehicle-sensor-data storage 112 (S111). The processing in step S111 is conducted by vehicle-sensor-data acquirer 130. Vehicle sensor data acquirer 130 may, for example, acquire the vehicle sensor data from vehicle-sensor-data storage 112.

The vehicle sensor data as used herein will be described. FIG. 5 shows one example of the vehicle sensor data according to the present embodiment. The vehicle sensor data is obtained by selecting information that can be used as an input in the attack detection processing, from vehicle network data expressed in binary form. As illustrated in FIG. 5, the vehicle sensor data includes sensor identifier 142, data ID 143, acquisition time 144, and sensor value 145.

Sensor identifier 142 is an identifier for uniquely identifying a target for vehicle control indicated by one sensor data item included in the vehicle sensor data. Examples of sensor identifier 142 include "vehicle speed" and "shift".

Data ID 143 is an identifier for uniquely identifying one vehicle sensor data item 141 for each sensor identifier described above included in the vehicle sensor data. For example, data ID 143 may be a numerical value assigned in order from 1. For example, data ID 143 may be assigned to each sensor identifier in order from 1. As another alternative, for example, data ID 143 may be assigned in order of the acquisition time.

Acquisition time 144 is time-of-day data that indicates the time when the vehicle sensor data has been received from the vehicle network. For example, when sensor identifier 142 is "vehicle speed", acquisition time 144 indicates a periodic time of day, and when sensor identifier 142 is an identifier that may include the occurrence of an event such as "shift", acquisition time 144 may indicate a non-periodic time of day. For example, acquisition time 144 can be acquired according to a time stamp of a message with which the vehicle sensor data is transmitted.

Note that acquisition time 144 may indicate a time of day when sampler 101 has received the vehicle sensor data from the vehicle network. FIG. 5 shows an example in which acquisition time 144 is the time (relative time) elapsed from a reference time, but it should be noted that acquisition time 144 is not limited thereto and may be an absolute time.

Sensor value 145 is numeric data that indicates the contents of vehicle control corresponding to sensor identifier 142. The vehicle sensor data includes a plurality of sensor values.

In FIG. 5, for example when sensor identifier 142 is "vehicle speed", sensor value 145 associated with acquisition time 144 of "25.00 ms" is "22.11 km/h", and sensor value 145 associated with next acquisition time 144 of "50.01 ms" is "22.50 km/h". This indicates that the cycle of receiving vehicle speed is approximately 25 ms. Below is a description of an example in which the cycle of receiving vehicle speed is approximately 25 ms, but the receiving cycle is not limited thereto.

Referring back to FIG. 4, the descriptions will now return to the sampling rule generation processing. Sampling rule generator 110 calculates data variance (e.g., variance value) and vehicle event information (e.g., flag information) for each sensor identifier 142 included in the vehicle sensor data, the data variance indicating a variation in sensor value 145, and the vehicle event information being included in the vehicle sensor data and indicating whether a vehicle event indicating event-type sensor identifier 142 has occurred (S112). Event-type sensor identifier 142 includes, for example, switching between ON and OFF of the engine and shift switching. The processing in step S112 is conducted by sensor-data stability calculator 131.

Next, sampling rule generator 110 determines whether the vehicle event information (flag information) is "present" or whether the data variance is greater than or equal to a first threshold value (S113). The processing in step S113 is conducted by sampling rule determiner 132.

When the data variance is greater than or equal to the first threshold value or when the vehicle event information indicates "present", i.e., when a vehicle event has occurred (Yes in S113), sampling rule determiner 132 sets the sampling rule to high-density sampling (S114). For example, when the data variance is greater than or equal to the first threshold value, the vehicle sensor data indicates low stability (e.g., wide variance) and accordingly high-density sampling is performed. This is because, when the data variance is greater than or equal to the first threshold value, the result of determination as to the presence or absence of an attack after sampling has a low recall ratio. Besides, it is, for example, assumed that the vehicle sensor data indicates low stability for a given period of time immediately after the occurrence of a vehicle event, and therefore high-density sampling is performed. This is because the number of sensor values included in the long-term sensor flow is insufficient when the long-term sensor flow is initialized (reset) due to the occurrence of the vehicle event.

If otherwise (No in S113), i.e., when the data variance is less than the first threshold value and the vehicle event information indicates "absent", sampling rule determiner 132 sets the sampling rule to low-density sampling (S115). For example, when the data variance is less than the first threshold value, the vehicle sensor data indicates high stability (e.g., narrow variance) and accordingly low-density sampling is performed. This is because, if otherwise, the result of determination as to the presence or absence of an attack after sampling has a high recall ratio. Besides, it is, for example, assumed that the vehicle sensor data indicates high stability for a period of time other than the aforementioned given period of time immediately after the occurrence of a vehicle event, and therefore low-density sampling is performed. This is because the number of sensor values included in the long-term sensor flow is sufficient during the period of time other than the aforementioned given period of time.

The terms "low-density" and "high density" as used herein have relative meanings, and the high-density sampling means a higher sampling density than the low-density sampling. The sampling density is achieved by increasing or decreasing at least one of the sampling time and the sampling interval. For example, the high-density sampling satisfies at least one of the following conditions: a longer sampling time than the low-density sampling and a shorter sampling interval than the low-density sampling. For example, the high-density sampling may have both a longer sampling time and a shorter sampling interval than the low-density sampling.

Next, sampling rule determiner 132 stores the set sampling rule in sampling rule storage 113 (S116).

As described above, sampling rule generator 110 may determine the sampling interval and the sampling time described above on the basis of, for example, the variance value and the flag information. For example, sampling rule generator 110 may determine the sampling time and the sampling interval on the basis of a combination of the result of determination as to whether the variance value is greater than or equal to the first threshold value and information on whether the flag information indicates no occurrence of a change in sensor values.

Figures 6, 7:
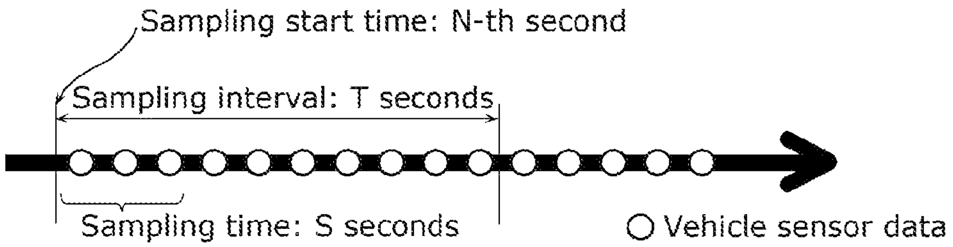
FIG. 6 is a diagram for describing sampling according to the embodiment.
FIG. 7 shows one example of sampling rule data according to the embodiment.

The details of the sampling will now be described. FIG. 6 is a diagram for describing the sampling according to the present embodiment. In FIG. 6, open circles indicate the acquisition of the vehicle sensor data, and the horizontal axis in FIG. 6 indicates time. FIG. 6 shows an example in which 10 vehicle sensor data items (sensor values) have been acquired during a sampling interval of T seconds.

As illustrated in FIG. 6, the sampling interval is the interval at which the vehicle sensor data is sampled, and the sampling time is the time during which sampling continues at the sampling intervals. The sampling time is temporally continuous and, for example, does not include discrete periods of time. That is, the vehicle sensor data sampled during the sampling time is temporally continuous. The sampling start time is the time when the sampling of the vehicle sensor data starts, and for example, may be the start time of the sampling interval. Note that the sampling start time is not limited to be the start time of the sampling interval (e.g., the time when measurement of the time of the sampling interval starts), and may be any time before (T-S) seconds elapsed from the start time of the sampling interval. That is, the sampling start time may be determined to satisfy the following expression, where N is the sampling start time.

$$0 \leq N < T-S \qquad \text{(Expression 1)}$$

The sampling of the vehicle sensor data is conducted for a sampling time of S seconds from the sampling start time, i.e., N-th second, during the sampling interval of T seconds.

The vehicle sensor data acquired during the sampling time of S seconds from the sampling start time, i.e., the N-th second, in the sampling interval of T seconds is referred to as sampling data. That is, FIG. 6 shows an example in which 10 vehicle sensor data items are acquired during the sampling interval of T seconds, but among them, only three vehicle sensor data items among them are selected as the sampling data. In other words, among the 10 vehicle sensor data items acquired during the sampling interval of T seconds, seven vehicle sensor data items are not transmitted to sampling data monitor 102. In the present example, the high-density sampling and the low-density sampling are achieved by adjusting the sampling interval and the sampling time. A specific example of the sampling will be described later.

FIG. 7 shows one example of the sampling rule data according to the present embodiment. In the example illustrated in FIG. 7, the high-density sampling employs a sampling interval of 200.00 ms and a sampling time of 75.00 ms, and the low-density sampling employs a sampling interval of 1000.00 ms and a sampling time of 55.00 ms. In this way, for example, the sampling interval during the high-density sampling is shorter than the sampling interval during the low-density sampling, and for example, may be approximately one fifth of the sampling interval during the low-density sampling. The sampling time during the high-density sampling is longer than the sampling time during the low-density sampling, and for example, may be approximately 1.35 times the sampling interval during the low-density sampling. Note that the sampling interval and the sampling time during the high-density sampling and the sampling interval and the sampling time during the low-density sampling are not limited to the values described above.

As illustrated in FIG. 7, the sampling rule data includes sensor identifier 152, file number 153, data variance 154, vehicle event flag 155, sampling interval 156, and sampling time 157. The sampling rule data is a history that is stored in sampling rule storage 113 and that associates sensor identifier 152, information that is used in the determination by sampling rule determiner 132 (data variance 154 and vehicle event flag 155), and the sampling rule (sampling interval 156 and sampling time 157) with one another.

Sensor identifier 152 is an identifier associated with sensor identifier 142 in the vehicle sensor data and for uniquely identifying a target for vehicle control.

File number 153 is a file identifier for identifying one file unit that is transmitted via communicator 115. For example, a different sampling rule is calculated by incrementing the file number on the basis of the vehicle sensor data acquired during each predetermined running time.

Data variance 154 is numeric data that indicates a variation in sensor values acquired during a predetermined running time calculated for each sensor identifier 152 on a file-to-file basis.

Vehicle event flag 155 is flag information that indicates the occurrence or non-occurrence of a vehicle event, such as switching between ON and OFF of the engine or shift switching, that indicates event-type sensor identifier 142 provided separately from sensor identifier 152.

Sampling interval 156 indicates the density of sampling calculated on a file-to-file basis for each sensor identifier 152.

Sampling time 157 indicates the density of sampling calculated within one file for each sensor identifier 152.

Sampling rule generator 110 repeatedly executes the processing from steps S111 to S115 every time the vehicle sensor data to be processed is updated.

For example, when the file number is "2" and sensor identifier 152 is "vehicle speed" in FIG. 7, the data variance is 0.22 and the vehicle event flag indicates "absent". When a threshold value for the data variance is defined as 10, the data variance of 0.22 is less than or equal to the threshold value. Thus, in the case described above, the sampling rule is set to low-density sampling, and the amount of data to be transmitted can be considerably reduced by, for example, setting the sampling interval to "1000 ms" so as to make the sampling interval longer than the aforementioned cycle of "approximately 25 ms" and setting the sampling time to "55 ms" so as to make the sampling time approximately twice the aforementioned cycle.

Note that sampling rule determiner 132 may set different sampling densities when the data variance is greater than or equal to the first threshold value and when the vehicle event flag information indicates "present". That is, a plurality of sample densities may be set for the high-density sampling.

[3-1. Configuration of Sampling Data Generator]

Figure 8:
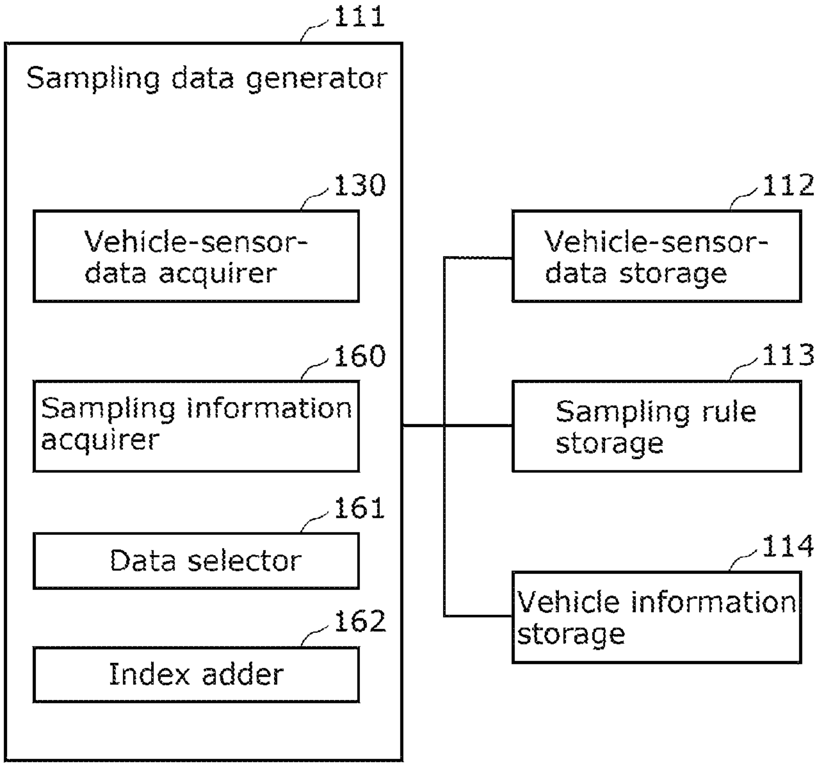
FIG. 8 is a block diagram illustrating a configuration of a sampling data generator according to the embodiment.

FIG. 8 is a block diagram illustrating a configuration of sampling data generator 111 according to the present embodiment. As illustrated in FIG. 8, sampling data generator 111 includes vehicle-sensor-data acquirer 130, sampling information acquirer 160, data selector 161, and index adder 162.

Vehicle-sensor-data acquirer 130 is a processing unit that acquires vehicle sampling data from vehicle-sensor-data storage 112. Vehicle-sensor-data acquirer 130 reads out the vehicle sampling data stored in vehicle-sensor-data storage 112. Note that vehicle-sensor-data acquirer 130 and vehicle-sensor-data acquirer 130 of sampling rule generator 110 may be a common constituent element, or may be different constituent elements.

Sampling information acquirer 160 is a processing unit that acquires the sampling rule determined by sampling rule generator 110 from sampling rule storage 113.

Data selector 161 is a processing unit that selects, from the vehicle sensor data acquired by vehicle-sensor-data acquirer 130, vehicle sensor data based on the sampling rule acquired from sampling rule storage 113.

Index adder 162 is a processing unit that associates the indices indicating temporal order with the sensor value selected by data selector 161 and adds the indices to the sensor value. Index adder 162 adds both of the first and second indices to each vehicle sensor data item (sensor value).

[3-2. Operations of Sampling Data Generator]

Figure 9:
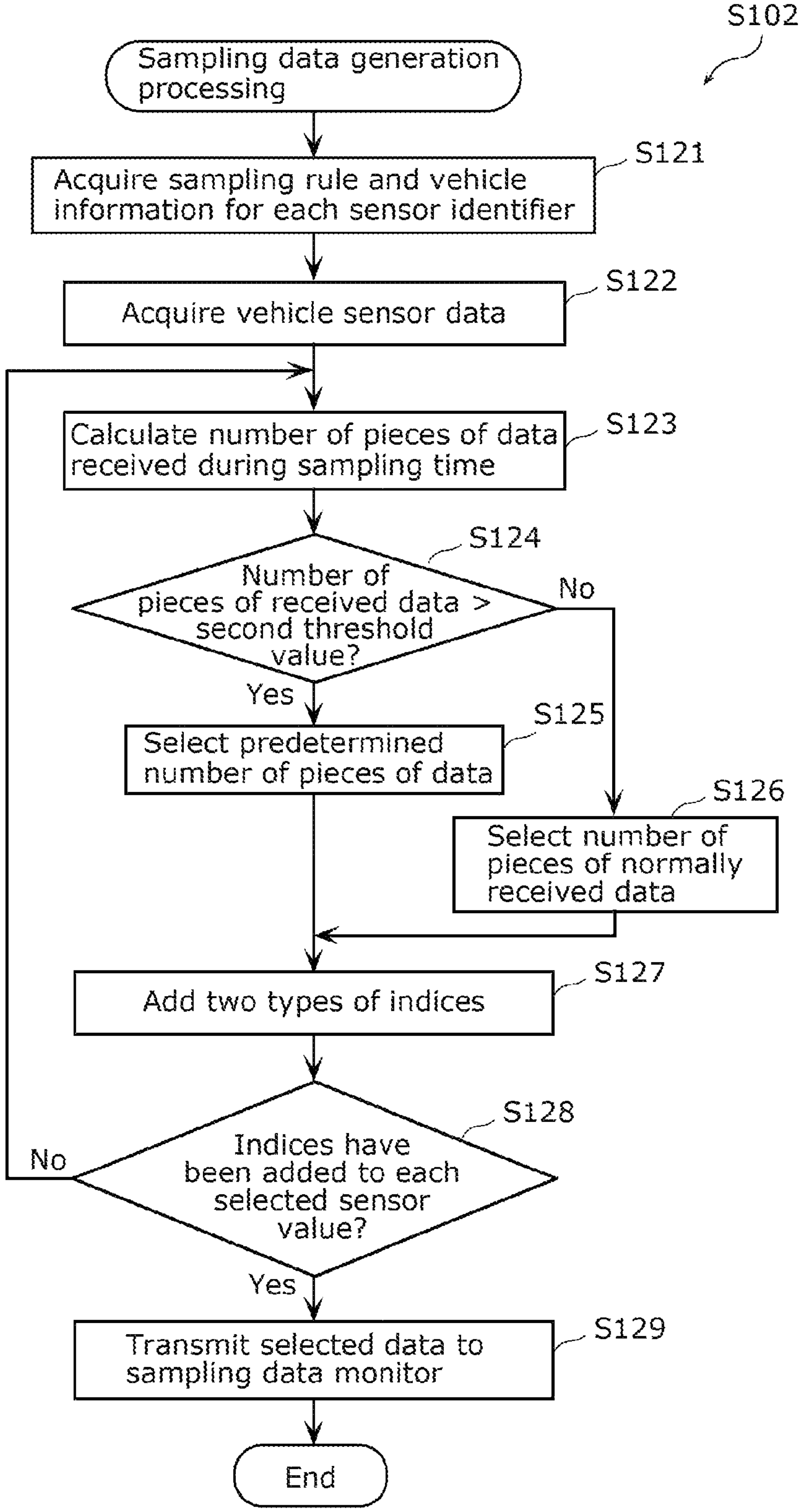
FIG. 9 is a flowchart illustrating sampling data generation processing according to the embodiment.

FIG. 9 is a flowchart illustrating the sampling data generation processing (S102) according to the present embodiment.

First, sampling data generator 111 acquires, for each sensor identifier, vehicle information and sampling rule data 151 that includes the sampling interval and the sampling time (S121). The processing in step S121 is conducted by sampling information acquirer 160. For example, sampling information acquirer 160 may acquire sampling rule data 151 from sampling rule storage 113 and acquire the vehicle information from vehicle information storage 114.

Sampling rule data 151 includes a vehicle number (not shown) that uniquely indicates an architecture of the vehicle and a cycle (the sampling interval and the sampling time) that indicates the cycle of acquisition for each sensor identifier included in the vehicle sensor data. The vehicle information may include, for example, vehicle event information.

Next, sampling data generator 111 acquires vehicle sensor data for a predetermined running time included in vehicle-sensor-data storage 112 (S122). The processing in step S121 is conducted by vehicle-sensor-data acquirer 130. Vehicle-sensor-data acquirer 130 may acquire, for example, the vehicle sensor data illustrated in FIG. 5.

Next, sampling data generator 111 calculates the number of data items received during the sampling time included in each sampling interval, on the basis of the vehicle sensor data and the sampling time included in the sampling rule data (S123). The processing in step S123 is conducted by data selector 161. Step S123 and subsequent steps are executed for each sampling time.

Next, sampling data generator 111 determines whether the number of received data items is greater than or equal to a second threshold value (S124). The processing in step S124 is conducted by data selector 161. When the above number of received data items is greater than a value (one example of the second threshold value) obtained by adding a predetermined margin to the number of normally received data items during the sampling time (Yes in S124), data selector 161 selects a predetermined number of temporally continuous vehicle sensor data items acquired during the sampling time. When the answer in step S124 is Yes, the received data (sensor values) may include a large number of data items resulting from an attack. If, in such a case, every data item is selected, the number of data items increases and this results in an increase in the amount of data. Therefore, when the answer in step S124 is Yes, data selector 161 selects only a predetermined number of received data items (S125). This enables selecting a predetermined number of received data items that include data resulting from an attack. Accordingly, it is possible to generate sampling data that can be used for attach detection while reducing the amount of data.

Note that the predetermined number of data items may, for example, be greater than the number of normally received data items. The second threshold value is not limited to the value obtained by adding a predetermined margin to the number of normally received data items, and may be the number of normally received data items itself, or may be a fixed value that is preset for each sensor identifier. The predetermined margin may, for example, be set based on the number of normally received data items, or may be a fixed value.

When the aforementioned number of received data items is less than or equal to the value obtained by adding the predetermined margin to the number of normally received data items during the sampling time (No in S124), data selector 161 selects the number of normally received data items (S126). For example, data selector 161 may select every received data item (sensor value) during the sampling time.

In this way, in steps S124 to S126, the number of vehicle sensor data items to be selected during the sampling time is determined based on the number of normally received data items to be observed during the sampling time, and the determined number of sensor data items to be selected is selected. For example, it is determined whether the number of sensor values observed during the sampling time is greater than or equal to the number of normally received data items, and when the number of sensor values is greater than or equal to the number of normally received data items, a predetermined number of sensor values may be selected, and when the number of sensor values is less than the number of normally received data items, all sensor values included in the vehicle sensor data may be selected.

The number of normally received data items as used herein indicates the number of data items normally received during the aforementioned sampling time, and is calculated in advance on the basis of the aforementioned cycle for each sensor identifier. For example, as illustrated in FIG. 7, when the sampling time for the sensor identifier indicating “vehicle speed” is set to “55 ms”, the number of normally received data items is “2” since the cycle is “approximately 25 ms”.

Next, sampling data generator 111 adds the first and second indices to the aforementioned selected data, the first index indicating the order of data on short-term movement of sensor values acquired during the sampling time, and the second index indicating the order of long-term movement of sensor values acquired in sampling intervals. That is, sampling data generator 111 adds two types of indices to each sensor value included in the selected data (S127). The processing in step S127 is conducted by index adder 162.

For example, when the sampling time is set to “55 ms”, index adder 162 adds the first indices of 1, 2, 3, and so on to a plurality of data items selected during the sampling time of “55 ms” sequentially in order from the first to last data items. For example, Index adder 162 may add the first index to each of a plurality of selected data items in order from earlier to later acquisition times.

Index adder 162 may further add the second index for use in unique identification, for example, every time step S125 or S126 described above is executed. For example, index adder 162 may add the second index to each of a plurality of selected data items in order from earlier to later sampling times. In the present example, when the sampling interval is set to “1000 ms”, the second index is changed at the time of processing data that is acquired after the elapse of approximately “1000 ms”.

Next, sampling data generator 111 determines whether the indices have already been added to each of the selected sensor values (S128). The processing in step S128 is conducted by index adder 162. For example, index adder 162 may determine whether the processing from steps S123 to S127 has already been performed on all sampling times included in two or more sampling intervals included in the predetermined running time.

When the indices have not yet been added to each of the selected sensor values (No in S128), index adder 162 returns to step S123 and performs processing in step S123 and subsequent steps on the next sampling time. That is, the processing from steps S123 to S127 that is performed on the vehicle sensor data to be processed is repeatedly executed for each sampling interval.

When index adder 162 have added the indices to each selected sensor value (Yes in S128), sampling data generator 111 transmits the selected data as sampling data to communicator 126 via communicator 115. That is, sampling data generator 111 transmits the selected data with the indices added thereto (sampling data) to sampling data monitor 102 (S129).

Here, the sampling data (selected data) transmitted by sampling data generator 111 will be described with reference to FIG. 10. FIG. 10 shows one example of the sampling data according to the present embodiment.

As illustrated in FIG. 10, the sampling data includes sensor identifier 172, evaluation ID 173, sensor value 174, first index 175, and second index 176.

Sensor identifier 172 and sensor value 174 are similar to sensor identifier 142 and sensor value 145 in the vehicle sensor data (see FIG. 5). Evaluation ID 173 is an identifier for uniquely identifying one sensor data item 171 for each sensor identifier 172 included in the sampling data.

As described above, first index 175 indicates the order of short-term movement of sensor values, and second index 176 indicates the order of long-term movement of sensor values.

For example, the sensor values indicated by the evaluation IDs of “1” and “2” both have “1” as the second index and are thus the sensor values acquired during the same sampling time. The sensor value indicated by the evaluation ID of “1” has “1” as the first index, and the sensor value indicated by the evaluation ID of “2” has “2” as the first index. This indicates that the sensor value indicated by the evaluation ID of “1” has been acquired and subsequently the sensor value indicated by the evaluation ID of “2” has been acquired.

When the second index is “1” or “2”, the number of sensor values is two, whereas when the second index is “3”, the number of sensor values is three or more. Since the sampling rule is determined for each sampling time, the number of sensor values may vary according to the sampling time, i.e., the second index.

For example, the sampling data illustrated in FIG. 10 may be transmitted to sampling data monitor 102.

[4-1. Configuration of Attack Detector]

Figure 11:
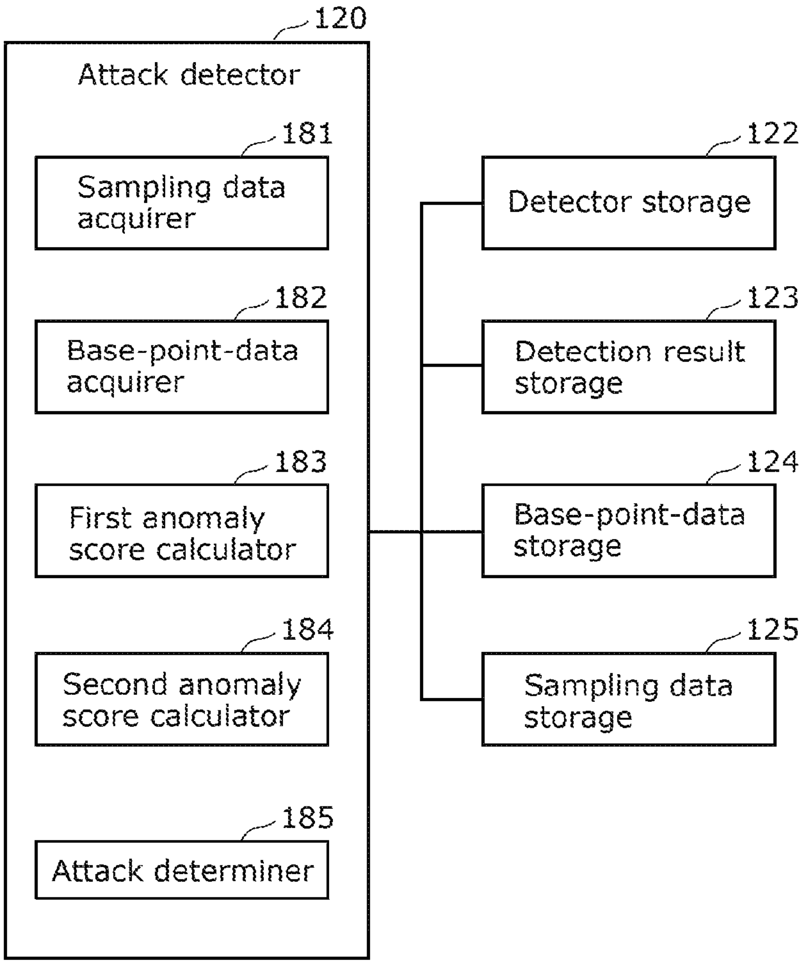
FIG. 11 is a block diagram illustrating a configuration of an attack detector according to the embodiment.

FIG. 11 is a block diagram illustrating a configuration of attack detector 120 according to the present embodiment. As illustrated in FIG. 11, attack detector 120 includes sampling data acquirer 181, base-point-data acquirer 182, first anomaly score calculator 183, second anomaly score calculator 184, and attack determiner 185.

Sampling data acquirer 181 is a processing unit that acquires sampling data from sampling data storage 125. For example, sampling data acquirer 181 may acquire the sampling data illustrated in FIG. 10.

Base-point-data acquirer 182 is a processing unit that acquires base point data that is used in the determination by attack determiner 185, from base-point-data storage 124. Base-point-data acquirer 182 acquires the short-term sensor flow and the long-term sensor flow as the base point data.

First anomaly score calculator 183 is a processing unit that calculates the first anomaly score on the basis of evaluation target data 191 and the short-term sensor flow, the first anomaly score indicating the degree of alienation between evaluation target data 191 and the short-term sensor flow. That is, first anomaly score calculator 183 calculates the first anomaly score of evaluation target data 191, using other data acquired during the sampling time in which evaluation target data 191 has been acquired. First anomaly score calculator 183 calculates an anomaly score of a change in sensor values within a short time such as one sampling time. For example, the short time may refer to a period of time less than or equal to one sampling interval (e.g., one sampling time).

For example, it can also be said that first anomaly score calculator 183 calculates the first anomaly score indicating the degree of anomalies in the evaluation target data, on the basis of the sensor values serving as the evaluation target data included in the sampling data, the first index, and the short-term sensor flow that indicates time series data including past sensor values acquired prior to the evaluation target data during the sampling time in which the sensor value serving as the evaluation target data has been acquired.

Second anomaly score calculator 184 is a processing unit that calculates the second anomaly score on the basis of evaluation target data 191 and the long-term sensor flow, the second anomaly score indicating the degree of alienation between evaluation target data 191 and the long-term sensor flow. That is, second anomaly score calculator 184 calculates the second anomaly score of evaluation target data 191, using data acquired in a plurality of sampling intervals including the sampling interval in which evaluation target data 191 has been acquired. Second anomaly score calculator 184 calculates an anomaly score of a change in sensor values within a long time such as a plurality of sampling intervals. For example, the long time may refer to a period of time longer than the short time and may refer to, for example, a period of time longer than one sampling interval.

For example, it can also be said that second anomaly score calculator 184 calculates the second anomaly score indicating the degree of anomalies in the evaluation target data, on the basis of the sensor values serving as the evaluation target data, the second index, and the long-term sensor flow that indicates a change in sensor values acquired during a past sampling interval prior to the sampling interval in which the sensor value serving as the evaluation target data has been acquired.

Attack determiner 185 is a processing unit that determines whether evaluation target data 191 has resulted from an attack, i.e., whether the vehicle is under cyberattack, on the basis of the calculated first and second anomaly scores, and outputs a determination result. In the present embodiment, attack determiner 185 calculates a third anomaly score on the basis of the first and second anomaly scores, compares the calculated third anomaly score with a predetermined threshold value (fifth threshold value), and determines on the basis of the result of the comparison whether evaluation target data 191 has resulted from an attack. Note that attack determiner 185 is not limited to being configured to calculate the third anomaly score, and may be configured to compare each of the first and second anomaly scores with a corresponding threshold value and determine on the basis of the result of the comparison whether evaluation target data 191 has resulted from an attack.

[4-2. Operations of Attack Detector]

Figure 12:
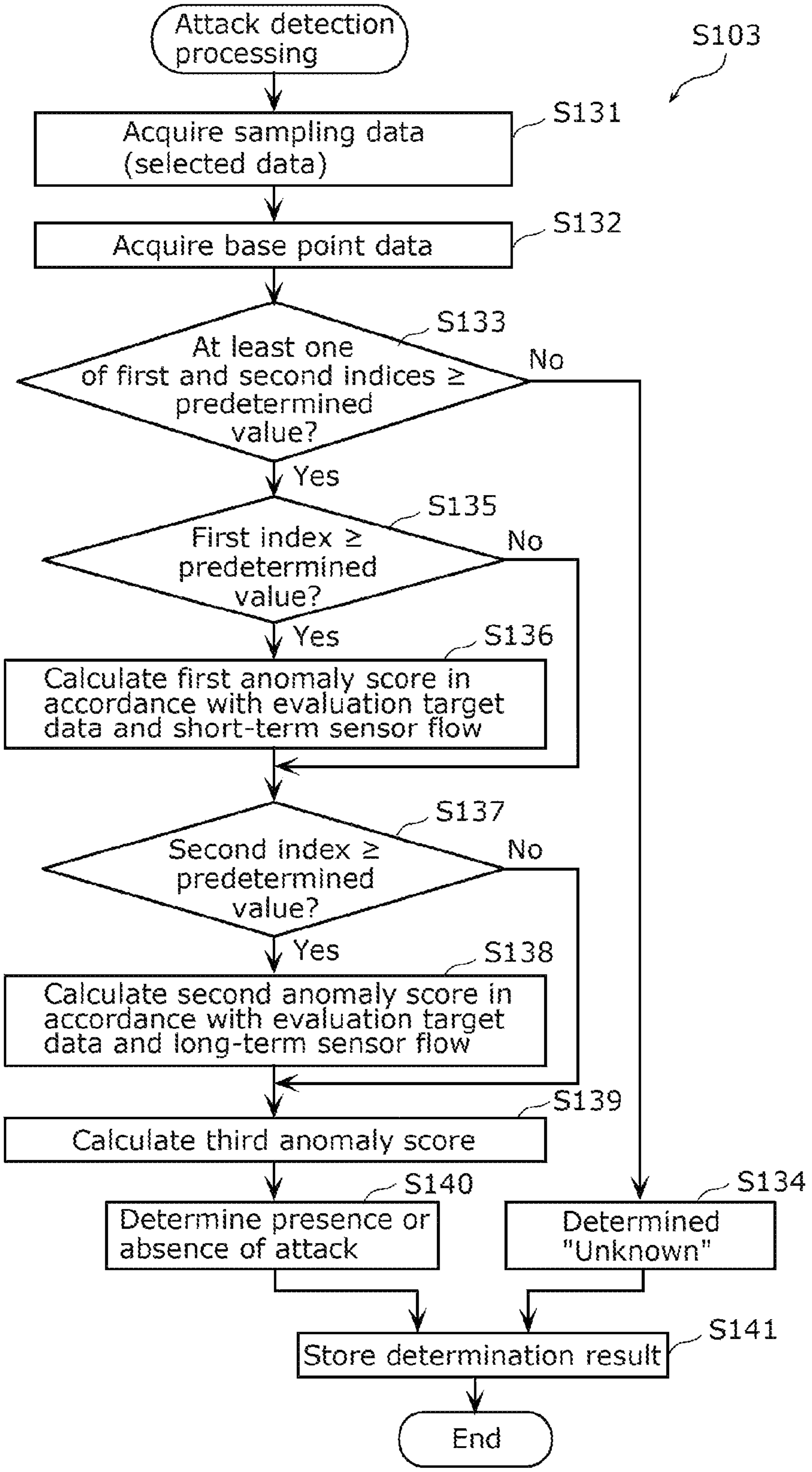
FIG. 12 is a flowchart illustrating attack detection processing according to the embodiment.

FIG. 12 is a flowchart illustrating the attack detection processing (S103) according to the present embodiment. For example, the attack detection processing illustrated in FIG. 12 may be performed on arbitrary sensor values included in the sampling data, or may be performed on all sensor values included in the sampling data. When the attack detection processing is performed on all of the sensor values, for example, the processing illustrated in FIG. 12 may be performed on the sensor values in order from earlier to later acquisition times.

First, attack detector 120 acquires the sampling data and selects evaluation target data that is one sampling data item (see evaluation target data 191 illustrated in FIG. 13) (S131). The processing in step S131 is conducted by sampling data acquirer 181.

Next, attack detector 120 acquires base point data that is associated with evaluation target data 191 (S132). The processing in step S132 is conducted by base-point-data acquirer 182.

FIG. 13 shows one example of the base point data according to the present embodiment.

As illustrated in FIG. 13, the base point data includes sensor identifier 192, evaluation ID 193, sensor value 194, first index 195, second index 196, short-term sensor flow 197, and long-term sensor flow 198.

Sensor identifier 192, evaluation ID 193, sensor value 194, first index 195, and second index 196 are similar to sensor identifier 172, evaluation ID 173, sensor value 174, first index 175, and second index 176 in the sampling data (see FIG. 10).

Short-term sensor flow 197 is a list of past sensor values, with which sensor values are uniquely identified, using the same second index as the second index of evaluation target data 191 and first indices prior to the first index of evaluation target data 191 as reference keys.

For example, in the case of the evaluation target data indicated by the evaluation ID of “82” in FIG. 13, a representative value of sensor values serving as the evaluation target data indicated by the evaluation ID of “81” is stored as the short-term sensor flow, using the second index of “3” and the first index of “1” prior to “2” as reference keys. The method of calculating the aforementioned representative value will be described later.

Meanwhile, long-term sensor flow 198 is a list of representative values of past sensor values, with which sensor values are uniquely identified, using second indices prior to the second index of evaluation target data 191 as a reference key.

For example, in the case of the evaluation target data with the evaluation ID of “82” in FIG. 13, representative values of sensor values of evaluation target data is stored as the long-term sensor flow, using the second indices of “1” and “2” prior to “3” as reference keys. The method for calculating the aforementioned representative values will be described later.

FIG. 14 shows one example of the detection-result information according to the present embodiment.

As illustrated in FIG. 14, the detection-result information includes sensor identifier 202, evaluation ID 203, sensor value 204, first anomaly score 205, second anomaly score 206, third anomaly score 207, and detection result 208. Detection result 208 is one example of the determination result associated with the evaluation target data.

Sensor identifier 202, evaluation ID 203, and sensor value 204 are similar to sensor identifier 172, evaluation ID 173, and sensor value 174 in the sampling data (see FIG. 10).

First anomaly score 205, second anomaly score 206, third anomaly score 207, and detection result 208 will be described later.

Referring back to FIG. 12, next, attack detector 120 determines whether at least one of the first and second indices is greater than or equal to a predetermined value (S133). The predetermined value is set in advance and stored in a storage. The predetermined value for the first index and the predetermined value for the second index may be the same value, or may be different values.

When at least one of the first and second indices of the evaluation target data is greater than or equal to the predetermined value (Yes in S133), attack detector 120 calculates an anomaly score described later (at least one of the first and second anomaly scores) and, when each of the first and second indices is less than the predetermined value (No in S133), outputs “Unknown” as the detection result (S134). When the answer in step S133 is Yes, attack detector 120 determines whether the first index is greater than or equal to a predetermined value (S135). The predetermined value is set in advance and stored in a storage. The predetermined value used in step S135 is one example of a third threshold value. For example, the third threshold value may be set to a value that enables accurate calculation of the first anomaly score.

For example, when the data indicated by the evaluation ID of "1" in FIG. 13 is the evaluation target data, the first index is "1" and the second index is "1". Thus, for example when the predetermined value is set to 2, the detection result acquired for the above data indicates "Unknown" as illustrated in FIG. 14. Note that when the detection result is determined as "Unknown", the first, second, and third anomaly scores may be "0".

Next, when at least one of the first and second indices of the evaluation target data is greater than or equal to the predetermined value (Yes in S133) and the first index is greater than or equal to the predetermined value (Yes in S135), attack detector 120 reads out a first detector and calculates the first anomaly score on the basis of evaluation target data 191 described above and the short-term sensor flow (S136), the first detector calculating the first anomaly score that indicates the degree of alienation between the evaluation target data and a normal short-term flow of sensor values (short-term sensor flow). The processing in step S136 is conducted by first anomaly score calculator 183.

When the answers in steps S133 and S135 are both Yes, first anomaly score calculator 183 reads out the first detector from detector storage 122. The first detector may be implemented as a trained model that has been trained to receive input of evaluation target data 191 and the short-term sensor flow and to output the first anomaly score that indicates the degree of alienation between evaluation target data 191 and the short-term sensor flow. The first detector is trained to output a larger first anomaly score as the degree of alienation increases, but the present disclosure is not limited to this example. For example, the first anomaly score may be a value ranging from 0 to 100 (e.g., normalized value), or may indicate a level (e.g., "high", "medium", or "low").

For example, when the data indicated by the evaluation ID of "82" in FIG. 13 is the evaluation target data, the first index is "2", the short-term sensor flow includes "35.11", and the sensor value is "100.50". In this case, the first anomaly score outputted from the first detector may, for example, be "95" as illustrated in FIG. 14. That is, the first anomaly score is calculated at 95 by first anomaly score calculator 183.

Note that the first detector may be an outlier detector implemented as a machine learning model such as one class-support vector machine (OC-SVM) based on the difference in sensor value between the evaluation target data and the short-term sensor flow. As another alternative, the first detector may also be a detector that determines whether the difference in acquisition time between the short-term sensor flow and the evaluation target data is based on cycle, using acquisition times instead of sensor values. Note that the detectors described above may be used as an integral unit.

Note that first anomaly score calculator 183 is not limited to being configured to calculate the first anomaly score using a machine learning model. For example, first anomaly score calculator 183 may calculate the first anomaly score, using a table (look-up table) that associates evaluation target data 191 and the short-term sensor flow with the first anomaly score, or may calculate the first anomaly score by predetermined computation using evaluation target data 191 and the short-term sensor flow.

When at least one of the first and second indices of the evaluation target data is greater than or equal to the predetermined value (Yes in S133) and the first index is less than the predetermined value (No in S135), attack detector 120 proceeds to step S137. When the answer in step S135 is No, there is only a small number of vehicle sensor data items acquired prior to the evaluation target data during the sampling time in which the sensor value serving as the evaluation target data has been acquired, and accordingly it is difficult to accurately determine whether the evaluation target data has resulted from anomalies. Therefore, when the answer in step S135 is No, attack detector 120 does not necessarily have to calculate the first anomaly score. When the answer in step S135 is No, attack detector 120 may set the first anomaly score to "0".

Next, attack detector 120 determines whether the second index is greater than or equal to a predetermined value (S137). The predetermined value is set in advance and stored in a storage. The predetermined value used in step S137 and the predetermined value used in step S133 may be the same value, or may be different values. The predetermined value used in step S137 is one example of a fourth threshold value. For example, the fourth threshold value may be set to a value that enables accurate calculation of the second anomaly score.

Next, when the second index is greater than or equal to the predetermined value (Yes in S137), attack detector 120 reads out a second detector and calculates the second anomaly score on the basis of evaluation target data 191 described above and the long-term sensor flow (S138), the second detector calculating the second anomaly score that indicates the degree of alienation between the evaluation target data and a normal long-term flow of sensor values (long-term sensor flow). The processing in step S138 is conducted by second anomaly score calculator 184.

When the answer in step S137 is Yes, second anomaly score calculator 184 reads out the second detector from detector storage 122. The second detector may be implemented as a trained model that is trained to receive input of evaluation target data 191 and the long-term sensor flow and to output the second anomaly score indicating the degree of alienation between evaluation target data 191 and the long-term sensor flow. The second detector is trained to output a larger second anomaly score as the degree of alienation increases, but the present disclosure is not limited to this example. For example, the second anomaly score may be a value ranging from 0 to 100 (e.g., normalized value), or may indicate a level (e.g., "high", "medium", or "low").

For example, when the data indicated by the evaluation ID of "82" in FIG. 13 is the evaluation target data, the second index is "3", the long-term sensor flow includes "22.50" and "33.50", and the sensor value is "100.50". In this case, the second anomaly score outputted from the second detector is "80" as illustrated in FIG. 14. That is, the second anomaly score is calculated at 80 by second anomaly score calculator 184.

Note that the second detector may be a point-of-change detector that predicts the behaviors of normal sensor values and determines the presence of anomalies on the basis of errors from actually measured values, using a recurrent neural network (RNN) model or an auto regressive moving average (ARIMA) model.

When the second index of the evaluation target data is less than the predetermined value (No in S137), attack detector 120 proceeds to step S139. When the answer in step S137 is No, there is only a small number of vehicle sensor data items acquired prior to the evaluation target data during the sampling interval in which the sensor value serving as the evaluation target data has been acquired, and accordingly it is difficult to accurately determine whether the evaluation target data has resulted from anomalies. Therefore, when the answer in step S137 is No, attack detector 120 does not necessarily have to calculate the second anomaly score. When the answer in step S137 is No, attack detector 120 may set the second anomaly score to "0".

Note that the first detector and the second detector may be different detectors, or may configure one detector.

Next, attack detector 120 calculates a third anomaly score from the first and second anomaly scores (S139). The processing in step S139 is conducted by attack determiner 185.

Note that the third anomaly score is based on the first and second anomaly scores. For example, the third anomaly score may be either the first anomaly score or the second anomaly score, or may be a statistic based on the first and second anomaly scores. The statistic may, for example, be an average value (e.g., weighting average), but may also be any of a median value, a mode value, a maximum value, and a minimum value.

Note that it is not an absolute necessity to calculate the third anomaly score.

Next, attack detector 120 determines the presence or absence of an attack, using the third anomaly score (S140). The processing in step S139 is conducted by attack determiner 185. It can also be said that attack determiner 185 determines whether the evaluation target data has resulted from an attack. For example, when the third anomaly score is greater than or equal to the fifth threshold value, attack determiner 185 determines that there is an attack ("Attack"). When the third anomaly score is less than the fifth threshold value, attack determiner 185 determines that there is no attack ("Normal").

For example, when data has an evaluation ID of "82" in FIG. 14, the first anomaly score of "95" and the second anomaly score of "80" are both calculated (when the answer in S135 is Yes and the answer in S137 is Yes), and the third anomaly score is calculated at "87" as an average value of the first and second anomaly scores In this case, when the fifth threshold value is set to "60", attack determiner 185 determines "Attack" for the sensor value indicated by the evaluation ID of "82". That is, attack determiner 185 determines that the sensor value of "100.50" has resulted from an attack.

When data has an evaluation ID of "81" in FIG. 14, only the second anomaly score of "6" is calculated (when the answer in S135 is No and the answer in S137 is Yes), and the third anomaly score is calculated at "6". In this case, when the fifth threshold value is set to "60", attack determiner 185 determines "Normal" for the evaluation target data. That is, attack determiner 185 determines that the sensor value of "35.11" does not result from an attack.

The case where the answer in step S135 is No and the answer in step S137 is Yes is assumed to be, for example, the case immediately after the start time of a sampling interval when the second index is greater than or equal to the predetermined value. In this case, all vehicle sensor data items that are to be acquired during the sampling time included in this sampling interval have not yet been acquired (e.g., the timing of the start of the sampling time), but there is an enough number of vehicle sensor data items acquired in the sampling intervals to determine the presence or absence of an attack. In other words, the case where the answer in step S135 is No and the answer in step S137 is Yes refers to the case where attack detection using the first detector is impossible, but attack detection using the second detector is possible.

At this time, attack detector 120 is capable of determining, on the basis of the second anomaly score obtained by the second detector, whether the evaluation target data has resulted from an attack.

Meanwhile, the case where the answer in step S135 is Yes and the answer in step S137 is No is assumed to be, for example, the case where the number of sampling intervals elapsed is small, but all of the vehicle sensor data items to be acquired during the sampling times included in the elapsed sampling intervals have already been acquired. In this case, there is only a small number of vehicle sensor data items acquired in the sampling intervals, but there is an enough number of vehicle sensor data items acquired during the sampling times to determine the presence or absence of an attack. In other words, the case where the answer in step S135 is Yes and the answer in step S137 is No refers to the case where attack detection using the first detector is possible, but attack detection using the second detector is impossible.

At this time, attack detector 120 uses the first anomaly score calculated by the first detector to determine whether the evaluation target data has resulted from an attack.

In this way, the first detector and the second detector complement each other in attack detection when each detector cannot perform detection. That is, attack detector 120 can reduce the period of time during which attack detection is impossible. This improves attack detection performance of attack detector 120.

Next, attack detector 120 stores the determination result of step S134 or S140 in detection result storage 123 (S141). It can also be said that attack detector 120 outputs the determination result to detection result storage 123.

In this way, when the first index of the evaluation target data is less than the third threshold value and the second index of the evaluation target data is less than the fourth threshold value, attack detector 120 determines that whether the evaluation target data has resulted from an attack is unknown (S134). When the third anomaly score based on the first and second anomaly scores is greater than or equal to the fifth threshold value, attack detector 120 determines that the evaluation target data has resulted from an attack, and when the third anomaly score is less than the fifth threshold value, attack detector 120 determines that the evaluation target data is normal (S140), and outputs a detection result indicating the result of the determination.

In FIG. 12, attack detector 120 may further use the vehicle event information to calculate the anomaly scores. For example, when the vehicle event information indicates the occurrence of at least one of the following events including switching between ON and OFF of the vehicle' engine, switching of the shift lever, and switching between ON and OFF of the self-operating mode, attack detector 120 may initialize (reset) the sensor values included in the long-term sensor flow. That is, when at least one of the above events has occurred, attack detector 120 may calculate the second anomaly score on the basis of the sensor value acquired after the above time of occurrence. In this case, it becomes necessary to accumulate sensor values included in the long-term sensor flow and therefore the second anomaly score cannot be calculated during this period of accumulation (e.g., a period of time corresponding to two or more sampling intervals), but the first anomaly score can be calculated if the first index is greater than or equal to the predetermined value.

In this way, when at least one of the above events has occurred, attack detector 120 detects an attack on the basis of the first anomaly score. This reduces the period of time during which attack detection is impossible. Accordingly, it is possible to further improve the attack detection performance of attack detector 120.

[5-1. Configuration of Base-Point-Data Update Unit]

Figure 15:
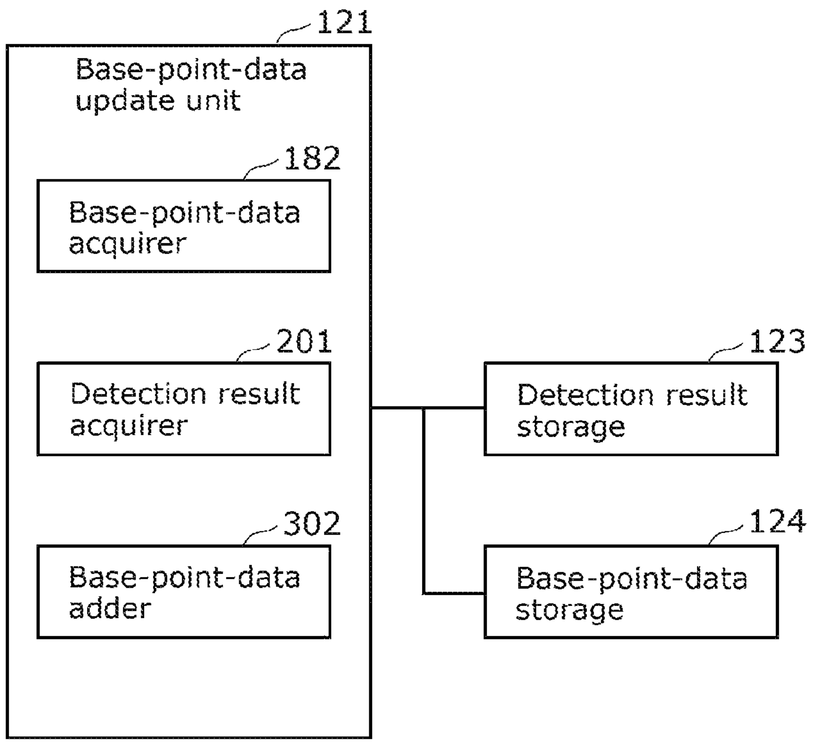
FIG. 15 is a block diagram illustrating a configuration of a base-point-data update unit according to the embodiment.

FIG. 15 is a block diagram illustrating a configuration of base-point-data update unit 121 according to the present embodiment. As illustrated in FIG. 15, base-point-data update unit 121 includes base-point-data acquirer 182, detection result acquirer 201, and base-point-data adder 302.

Base-point-data acquirer 182 is a processing unit that acquires base point data from base-point-data storage 124.

Detection result acquirer 201 is a processing unit that acquires the detection result acquired by attack detector 120 from detection result storage 123.

Base-point-data adder 302 is a processing unit that adds data corresponding to the detection result acquired by detection result acquirer 201 to the base point data acquired by base-point-data acquirer 182. It can also be said that base-point-data adder 302 updates the base point data.

[5-2. Operations of Base-Point-Data Update Unit]

Figure 16:
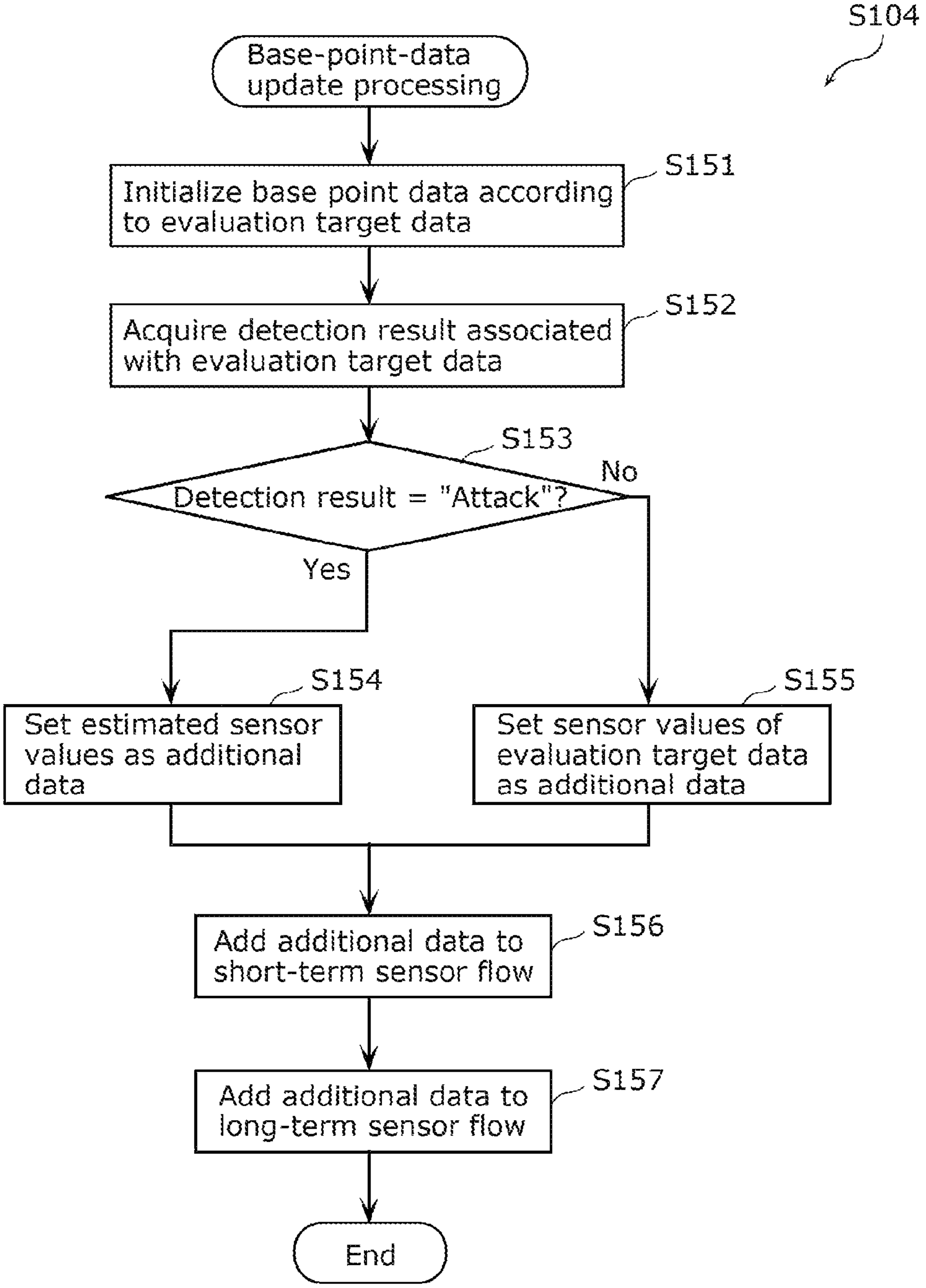
FIG. 16 is a flowchart illustrating base-point-data update processing according to the embodiment.

FIG. 16 is a flowchart illustrating the base-point-data update processing (S104) according to the present embodiment. The base-point-data update processing is conducted by base-point-data update unit 121.

First, base-point-data update unit 121 initializes the base point data on the basis of the evaluation target data acquired by base-point-data acquirer 182 (S151). Base-point-data update unit 121 acquires the base point data associated with evaluation target data 191, and when the first index of evaluation target data 191 is 1, initializes the short-term sensor flow of the base point data, and when the second index of evaluation target data 191 is 1, initializes the long-term sensor flow of the base point data. The initialization as used herein refers to setting the short-term sensor flow or the long-term sensor flow to a state of not including any sensor value. For example, short-term sensor flow 197 and long-term sensor flow 198 for the case where the evaluation ID is "1" in FIG. 13, and short-term sensor flow 197 for the case where the evaluation ID is "81" (i.e., [ ] in FIG. 13) indicate that the these sensor flows are initialized.

Next, base-point-data update unit 121 acquires the detection result for the evaluation target data (S152). The processing in step S152 is conducted by detection result acquirer 201. Detection result acquirer 201 reads out the detection result acquired for evaluation target data 191 from detection result storage 123. For example, detection result acquirer 201 may read out the detection result illustrated in FIG. 14.

Next, base-point-data update unit 121 determines whether the acquired detection result indicates "Attack" (S153). The processing from steps S153 to S157 is conducted by base-point-data adder 302. For example, base-point-data adder 302 may perform the determination in step S153 on the basis of detection result 208 corresponding to evaluation ID 203 of the evaluation target data.

Next, when the detection result indicates "Attack" (Yes in S153), base-point-data adder 302 sets an estimated sensor value serving as a value for complementing the sensor value as additional data (S154). When the detection result indicates either "Normal" or "Unknown" (No in S153), base-point-data adder 302 sets the sensor value of the evaluation target data (actually measured value) as additional data (S155).

Note that the estimated sensor value may be a value that is added to the last of the short-term sensor of the evaluation target data, or may be an average value of the short-term sensor flow. As another alternative, the estimated sensor value may be a predicted value for the sensor value of the evaluation target data be calculated by the second detector on the basis of the long-term sensor flow described above.

For example, when the evaluation ID in FIG. 13 is "82", the detection result indicates "Attack" and accordingly base-point-data adder 302 sets the estimated sensor value to "35.11" as a value added to the last of the short-term sensor flow of the evaluation target data.

Next, base-point-data adder 302 updates the short-term sensor flow (mathematical expression (Math. 1)) that is used in the determination for the next evaluation target data according to the mathematical expression below (Math. 2).

[Math. 1]

$$S = \{S_1, S_2, S_3, S_j, \ldots \ldots\} \quad \text{(Expression 2)}$$

[Math. 2]

$$S_i = \begin{cases} p_i^j, \ (label_i^j = \text{"Attack"}) \\ x_i^j, \ (\text{otherwise}) \end{cases} \quad \text{(Expression 3)}$$

Here, $S_i$ is one sensor value included in the short-term sensor flow, i is the first index of the evaluation target data, and j is the second index of the evaluation target data. When the above detection result $label_i^i$ indicates "Attack", base-point-data adder 302 updates $S_i$ to the aforementioned estimated sensor value $p_i^j$. When the above detection result $label_i^i$ indicates "Normal" or "Unknown", base-point-data adder 302 updates $S_i$ to the aforementioned sensor value $x_i^j$ of the evaluation target data. Note that $S_i$ is one example of the representative value.

Next, base-point-data adder 302 updates the long-term sensor flow (Math. 3) according to the mathematical expression below (Math. 4).

[Math. 3]

$$H = \{h_1, h_2, h_3, h_j, \ldots \ldots\} \quad \text{(Expression 4)}$$

[Math. 4]

$$h_j = \begin{cases} p_i^j, \ (label_i^j = \text{"Attack"}) \\ x_i^j, \ (\text{otherwise}) \end{cases} \quad \text{(Expression 5)}$$

Here, $h_j$ is one sensor value included in the long-term sensor flow. When the above detection result $label_i^i$ indicates "Attack", base-point-data adder 302 updates $h_j$ to aforementioned estimated sensor value $p_i^j$. When the above detection result $label_i^i$ indicates "Normal" or "Unknown", base-point-data adder 302 updates $h_j$ to the aforementioned sensor value $x_i^j$ of the evaluation target data. Note that $h_j$ is one example of the representative value.

In this way, every time the determination is made as to whether the detection result indicates "Attack", base-point-data adder 302 updates the two types of base point data and uses the updated data for the next determination.

Although an example of monitoring system 100 in which the sampling processing and the attack detection processing are performed by different devices is given in the above description, the sampling processing and the attack detection processing may be performed by the same device (e.g., one device).

As described above, the sampling data is generated by adjusting the sampling interval and the sampling time on the basis of the features of the vehicle sensor data targeted for the monitoring processing (e.g., attack detection processing). Moreover, the presence or absence of an attack is determined by calculating the two types of anomaly scores on the basis of the sampling data including the two types of indices indicating short- and long-term movement of sensor values. This improves the accuracy of attack detection while bringing down the monitoring cost.

When the detection result acquired for the evaluation target data indicates “Attack”, base-point-data update unit 121 estimates the sensor value to be taken by the evaluation target data by using at least one of the short-term sensor flow and the long-term sensor flow and updates the short-term sensor flow and the long-term sensor flow on the basis of the estimated sensor value, the first index, and the second index. When the detection result acquired for the evaluation target data indicates “Normal” or “Unknown”, base-point-data update unit 121 updates the short-term sensor flow and the long-term sensor flow on the basis of the sensor value of the evaluation target data (actually measured data), the first index, and the second index.

This reduces the likelihood that outliers such as attacks may be mixed into the base point list. Accordingly, the use of the base point list improves the accuracy of attack detection while bringing down the monitoring cost.

Hereinafter, usage patterns of monitoring system 100 described above will be described.

Figure 17:
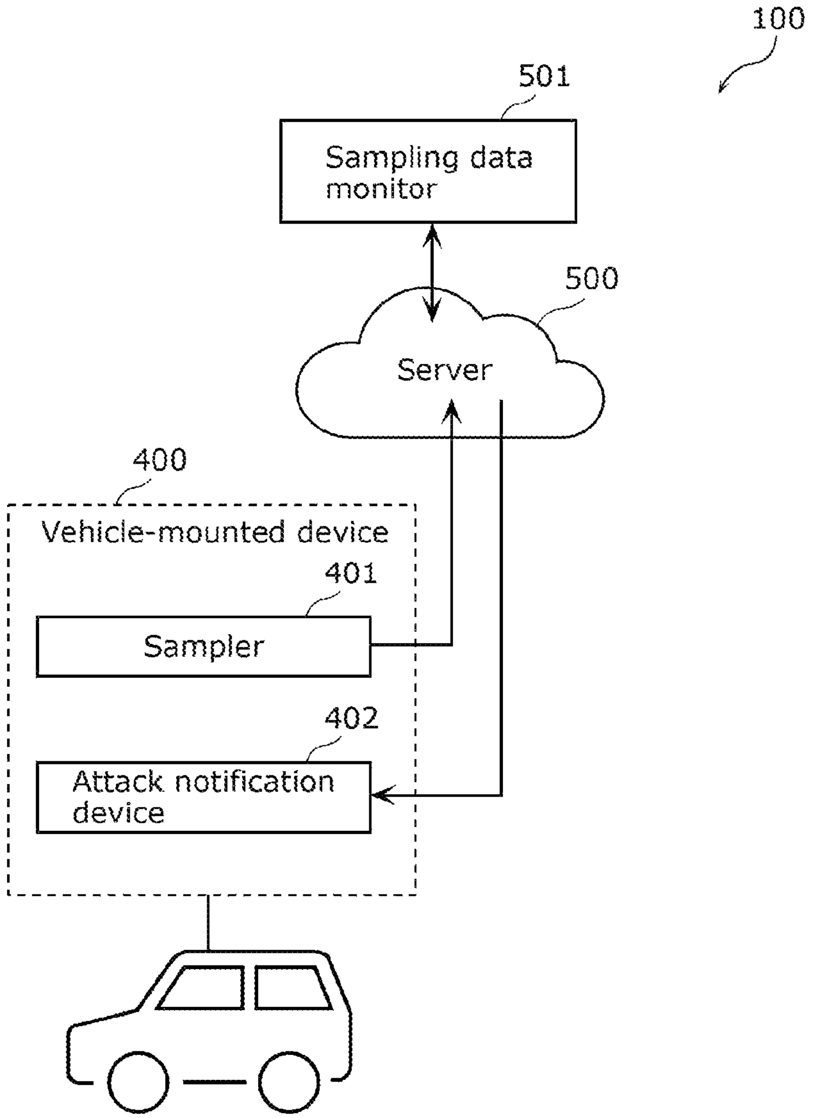
FIG. 17 is a schematic diagram illustrating a configuration of a monitoring system according to another embodiment.

FIG. 17 is a schematic diagram illustrating a configuration of monitoring system 100 according to the present embodiment. FIG. 17 is a block diagram illustrating the configuration of monitoring system 100 that includes sampler 401 and sampling data monitor 501. Monitoring system 100 includes server 500 in the cloud and vehicle-mounted device 400. Monitoring system 100 is capable of acquiring selected vehicle sensor data (sampling data) via vehicle-mounted device 400 and detecting an attack on the basis of the acquired vehicle sensor data.

For example, vehicle-mounted device 400 and server 500 may be communicably connected to each other via a public communication network such as the Internet. Vehicle-mounted device 400 may, for example, be a security electronic control unit (ECU) or a car navigation device.

Vehicle-mounted device 400 includes sampler 401 and attack notification device 402.

Sampler 401 is a device that transmits a result of sampling vehicle network data (sampling data) to sampling data monitor 501. For example, sampler 401 may convert CAN data expressed in binary form into sensor values and further convert the sensor values into sampling data for each predetermined running time. Then, sampler 401 transmits the sampling data to sampling data monitor 501.

Attack notification device 402 is a device that notifies a driver of the occurrence of an attack on a vehicle network received from server 500. For example, attack notification device 402 may notify the driver of the occurrence of an attack and output a voice or screen that instructs the driver to drive in safety mode in which the vehicle is cut off from the network. Attack notification device 402 may be implemented as, for example, a display or a speaker.

Sampling data monitor 501 determines the presence or absence of an attack on the vehicle network data (e.g., sampling data) received from vehicle-mounted device 400 and, when the presence of an attack is detected, transmits the result of attack detection to attack notification device 402.

Note that the configuration of sampler 401 may be similar to the configuration of sampler 101. The configuration of sampling data monitor 501 may be similar to the configuration of sampling data monitor 102.

Figure 18:
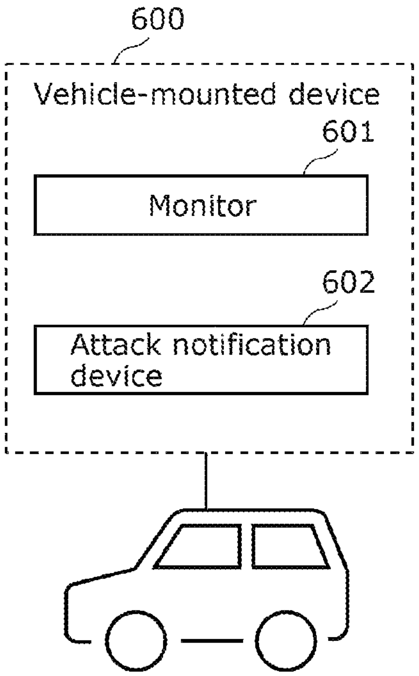
FIG. 18 is a schematic diagram illustrating a configuration of a vehicle-mounted device according to another embodiment.

FIG. 18 is a schematic diagram illustrating a configuration of vehicle-mounted device 600 according to the present embodiment. FIG. 18 is a block diagram illustrating the configuration of vehicle-mounted device 600 that includes monitor 601. Vehicle-mounted device 600 includes monitor 601 and attack notification device 602.

Monitor 601 determines the presence or absence of an attack from the result of sampling vehicle network data only inside the vehicle and, when the presence of an attack is detected, transmits the result of attack detection to attack notification device 602. For example, monitor 601 may be configured to have the functions of sampler 101 and sampling data monitor 102. In this way, the functions of sampler 101 and sampling data monitor 102 may be implemented by a single device (e.g., a device mounted on a vehicle). Monitor 601 is one example of an attack detection system.

Attack notification device 602 is a device that notifies a driver of the occurrence of an attack on a vehicle network received from monitor 601. Attack notification device 602 may be implemented as, for example, a display or a speaker.

In this way, monitoring system 100 in FIG. 17 and monitor 601 in FIG. 18 can achieve attack detection at low monitoring cost by appropriately determining the presence or absence of an attack on the basis of the result of sampling the vehicle network. Monitoring system 100 and monitor 601 can also reduce the occurrence of accidents that may be caused by attacks because they are capable of notifying the driver of the fact that the attack has been detected via the notification of the detection result.

Other Embodiments

While the monitor according to the embodiment has been described thus far, the present disclosure is not intended to be limited to this embodiment.

For example, the present disclosure has been described as a security measure for the vehicle network mounted on a vehicle such as an automobile, but the range of application of the present disclosure is not limited thereto. For example, the present disclosure may also be applied to different mobility entities such as construction machines, marine vessels, railways, and airplanes other than vehicles such as automobiles. That is, the present disclosure is applicable as a cybersecurity measure for mobility entity networks and mobility entity network systems.

Each processing unit included in the monitor according to the embodiment described above is typically implemented as an LSI serving as an integrated circuit. These processing units may be individually packaged into a single chip, or some or all of them may be packaged into a single chip.

The method of circuit integration is not limited to LSI, and may be implemented by using a dedicated circuit or a general-purpose processor. A field programmable gate array (FPGA) that enables programming after the manufacture of LSI, or a reconfigurable processor capable of reconfiguring connections and settings of circuit cells inside an LSI may be used.

The present disclosure may be implemented as a monitoring method (e.g., attack detection method) that is executed by a monitoring system. For example, one aspect of the present disclosure may be a computer program that causes a computer to execute each characteristic step included in the monitoring method.

Another aspect of the present disclosure may be a non-transitory computer-readable recording medium such as a DVD that records such a program. For example, such a program may be recorded on a recording medium and circulated or distributed. For example, such a program and digital signals of the program may be transmitted via an electricity communication line, a wireless or wired communication line, a network typified by the Internet, data broadcasting, or any other means. For example, a distributed program may be installed in a device that includes a different processor, and the processor may be caused to execute the program so as to perform each processing described above.

Although an example in which the first order information is the first index has been described in the above embodiment, the present disclosure is not limited thereto. For example, the first order information may be an absolute time. Although an example in which the second order information is the second index has been described in the above embodiment, the present disclosure is not limited thereto. For example, the second order information may be an absolute time at which a sampling interval starts.

Each constituent element in the above-described embodiment may be configured in the form of exclusive hardware, or may be realized by executing a software program suitable for the constituent element. Each constituent element may be realized by means of a program executor, such as a CPU or a processor, reading out and executing a software program recorded on a recording medium such as a hard disk or a semiconductor memory.

The way of dividing functional blocks in the block diagrams is merely one example, and a plurality of functional blocks may be implemented as a single functional block, or one functional block may be divided into a plurality of functional blocks, or some functions may be transferred to a different functional block. The functions of a plurality of functional blocks having similar functions may be processed in parallel or in time sequence by single hardware or software.

When the monitoring system is realized by a plurality of devices, the function of the sampler and the function of the sampling data monitor may be divided in any way into the devices.

The order of execution of each step in each flowchart is merely one example used to specifically describe the present disclosure, and may be a different order other than the above-described order. As another alternative, some of the steps described above may be executed simultaneously (in parallel) with other steps.

Although the monitoring system according to one or a plurality of aspects of the present disclosure has been described based on one embodiment, the present disclosure is not limited to this embodiment. One or a plurality of aspects of the present disclosure may also include modes such as those obtained by making various modifications conceivable by those skilled in the art to the embodiment and those constituted by any combination of constituent elements in different embodiments without departing from the gist of the present disclosure.

INDUSTRIAL APPLICABILITY

The present disclosure is applicable to a monitor for monitoring vehicle sensor data and makes it possible to, for example, appropriately determine whether data for vehicle control included in the vehicle sensor data has resulted from an attack. For example, the present disclosure is usable in vehicle-mounted devices such as an ECU for security or in monitors or monitoring systems such as a security information and event management (SIEM) in a remote monitoring server.

The invention claimed is:

1. An attack detection method for detecting an attack from sensor data that is transmitted and received for control of a mobility entity inside the mobility entity, the attack detection method comprising:

determining, for each of identifiers of sensor values included in the sensor data, a sampling rule that includes sampling intervals and sampling times in the sampling intervals, on a basis of at least one of a statistic or event information on the mobility entity, the sampling rule being a rule for selecting the sensor values that are used to detect the attack from the sensor data, the statistic indicating a variation in the sensor values included in the sensor data, and the event information indicating timing of a change in the sensor values;

generating sampling data that includes two or more sensor values, first order information, and second order information on a basis of the sampling intervals and the sampling times, the two or more sensor values having been selected from the sensor data, the first order information indicating a first temporal order of the two or more sensor values acquired during each of the sampling times, and the second order information indicating a second temporal order of the two or more sensor values acquired in the sampling intervals;

calculating a first anomaly score on a basis of a sensor value serving as evaluation target data included in the sampling data, the first order information, and a short-term sensor flow, the first anomaly score indicating a first degree of an anomaly in the evaluation target data, the short-term sensor flow indicating time series data including a past sensor value acquired prior to the sensor value serving as the evaluation target data during a sampling time in which the sensor value serving as the evaluation target data has been acquired, among the sampling times;

calculating a second anomaly score on a basis of the sensor value serving as the evaluation target data, the second order information, and a long-term sensor flow, the second anomaly score indicating a second degree of the anomaly in the evaluation target data, the long-term sensor flow indicating a change in sensor values acquired during a past sampling interval prior to a sampling interval in which the sensor value serving as the evaluation target data has been acquired among the sampling intervals;

determining whether the evaluation target data has resulted from the attack on a basis of the first anomaly score and the second anomaly score that have been calculated; and outputting a determination result of whether the evaluation target has resulted from the attack to a device that at least one of visually outputs the determination result or audibly notifies of the determination result in response to the evaluation target data being determined to have resulted from the attack.

2. The attack detection method according to claim 1, wherein the statistic includes a variance value that indicates the variation in the sensor values for each of identifiers of the sensor values, the event information includes flag information that indicates whether the change has occurred in the sensor values, and in the determining of the sampling rule, the sampling intervals and the sampling times are determined based on the variance value and the flag information.

3. The attack detection method according to claim 2, wherein, in the determining of the sampling rule, the sampling times and the sampling intervals are determined based on a combination of a second determination result indicating whether the variance value is greater than or equal to a first threshold value and information indicating whether the flag information indicates no occurrence of the change in the sensor values.

4. The attack detection method according to claim 2, wherein the flag information indicates whether at least one of events has occurred, the events including switching between ON and OFF of an actuator of the mobility entity, switching of a shift lever, and switching between ON and OFF of a self-operating mode.

5. The attack detection method according to claim 1, wherein the generating of the sampling data includes determining, for each of the sampling times, a total number of sensor data items to be selected during the sampling time on a basis of a total number of normally received data items that are to be observed during the sampling time, and selecting the total number of sensor data items to be selected that has been determined.

6. The attack detection method according to claim 5, wherein the generating of the sampling data includes:

determining whether a total number of sensor values observed during the sampling time is greater than or equal to the total number of normally received data items;

when the total number of the sensor values is greater than or equal to the total number of normally received data items, selecting a predetermined number of the sensor values; and when the total number of the sensor values is less than the total number of normally received data items, selecting all of the sensor values included in the sensor data.

7. The attack detection method according to claim 1, wherein the first order information is a first index that indicates an order in which the two or more sensor values have been acquired during each of the sampling times, the second order information is a second index that indicates an order of the sampling intervals in which the two or more sensor values have been acquired, and the determining of whether the evaluation target data has resulted from the attack includes:

when the first index associated with the evaluation target data is less than a third threshold value and the second index associated with the evaluation target data is less than a fourth threshold value, determining that whether the evaluation target data has resulted from the attack is unknown;

when a third anomaly score based on the first anomaly score and the second anomaly score is greater than or equal to a fifth threshold value, determining that the evaluation target data has resulted from the attack; and when the third anomaly score is less than the fifth threshold value, determining that the evaluation target data is normal.

8. The attack detection method according to claim 1, further comprising:

updating the short-term sensor flow and the long-term sensor flow on a basis of the determination result associated with the evaluation target data, the first order information, and the second order information.

9. The attack detection method according to claim 8, wherein the updating includes:

when the determination result associated with the evaluation target data indicates that the evaluation target data has resulted from the attack, estimating a sensor value that the evaluation target data is supposed to take from at least one of the short-term sensor flow or the long-term sensor flow and updating the short-term sensor flow and the long-term sensor flow on a basis of the first order information, the second order information, and the sensor value that has been estimated; and when the determination result associated with the evaluation target data indicates that the evaluation target data is normal or that whether the evaluation target data has resulted from the attack is unknown, updating the short-term sensor flow and the long-term sensor flow on a basis of the first order information, the second order information, and the sensor values serving as the evaluation target data.

10. The attack detection method according to claim 1, wherein the sensor data is stored in equipment that is mounted on the mobility entity, and indicates a result of decoding network data that is expressed in byte form and transmitted and received at an arbitrary running time interval.

11. The attack detection method according to claim 1, wherein the mobility entity is a vehicle.

12. An attack detection system for detecting an attack from sensor data that is transmitted and received for control of a mobility entity inside the mobility entity, the attack detection system comprising:

a processor; and a memory including a program that, when executed by the processor, causes the processor to perform operations, the operations including:

determining, for each of identifiers of sensor values included in the sensor data, a sampling rule that includes sampling intervals and sampling times in the sampling intervals, on a basis of at least one of a statistic or event information, the sampling rule being for selecting the sensor values that are used to detect the attack from the sensor data, the statistic indicating a variation in the sensor values included in the sensor data, and the event information indicating timing of a change in the sensor values;

generating sampling data on a basis of the sampling intervals and the sampling times, the sampling data including two or more sensor values selected from the sensor data, first order information, and second order information, the first order information indicating a first temporal order of the two or more sensor values acquired during each of the sampling times, and the second order information indicating a second temporal order of the two or more sensor values acquired in the sampling intervals;

calculating a first anomaly score on a basis of a sensor value serving as evaluation target data included in the sampling data, the first order information, and a short-term sensor flow, the first anomaly score indicating a first degree of an anomaly in the evaluation target data, the short-term sensor flow indicating time series data including a past sensor values acquired prior to the sensor value serving as the evaluation target data during a sampling time in which the sensor value serving as the evaluation target data has been acquired, among the sampling times;

calculating a second anomaly score on a basis of the sensor values serving as the evaluation target data, the second order information, and a long-term sensor flow, the second anomaly score indicating a second degree of the anomaly in the evaluation target data, the long-term sensor flow indicating a change in sensor values acquired during a past sampling intervals prior to a sampling interval in which the sensor value serving as the evaluation target data has been acquired among the sampling intervals;

determining whether the evaluation data has resulted from the attack on a basis of the first anomaly score and the second anomaly score that have been calculated; and outputting a determination result of whether the evaluation target has resulted from the attack to a device that at least one of visually outputs the determination result or audibly notifies of the determination result in response to the evaluation target data being determined to have resulted from the attack.

13. A non-transitory computer-readable recording medium having recorded thereon a program for causing a computer to execute the attack detection method according to claim 1.

* * * * *